United States Patent
Nonogaki et al.

(10) Patent No.: US 8,108,622 B2
(45) Date of Patent: Jan. 31, 2012

(54) MEMORY MANAGEMENT SYSTEM AND IMAGE PROCESSING APPARATUS

(75) Inventors: Nobuhiro Nonogaki, Kanagawa (JP); Takeshi Kodaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 981 days.

(21) Appl. No.: 12/032,404

(22) Filed: Feb. 15, 2008

(65) Prior Publication Data

US 2008/0215817 A1    Sep. 4, 2008

(30) Foreign Application Priority Data

Feb. 21, 2007    (JP) ................. 2007-041301

(51) Int. Cl.
*G06F 12/00* (2006.01)

(52) U.S. Cl. ......... 711/143; 711/130; 711/166; 718/106

(58) Field of Classification Search ............. 711/147, 711/130, 143, 166; 718/106
See application file for complete search history.

(56) References Cited

U.S. PATENT DOCUMENTS

| 6,065,077 | A | 5/2000 | Fu |
| 6,108,754 | A | 8/2000 | Lindholm |
| 6,466,624 | B1 * | 10/2002 | Fogg ................ 375/240.27 |
| 6,886,085 | B1 * | 4/2005 | Shuf et al. ............. 711/159 |

OTHER PUBLICATIONS

U.S. Appl. No. 12/334,973, filed Dec. 15, 2008, Nonogaki.
U.S. Appl. No. 11/946,419, filed Nov. 28, 2007, Kodaka, et al.

* cited by examiner

*Primary Examiner* — Matthew Bradley
*Assistant Examiner* — Kalpit Parikh
(74) *Attorney, Agent, or Firm* — Oblon, Spivak, McClelland, Maier & Neustadt, L.L.P.

(57) ABSTRACT

A memory management system includes a plurality of processors, a shared memory that can be accessed from the plurality of processors, cache memories provided between each processor of the plurality of processors and the shared memory and invalidation or write back of a specified region can be commanded from a program running on a processor. Programs running on each processor invalidate an input data region of a cache memory with an invalidation command immediately before execution of a program as a processing batch, and write back an output data region of a cache memory to the shared memory with a write back command immediately after execution of a program as a processing batch.

15 Claims, 30 Drawing Sheets

FIG.2
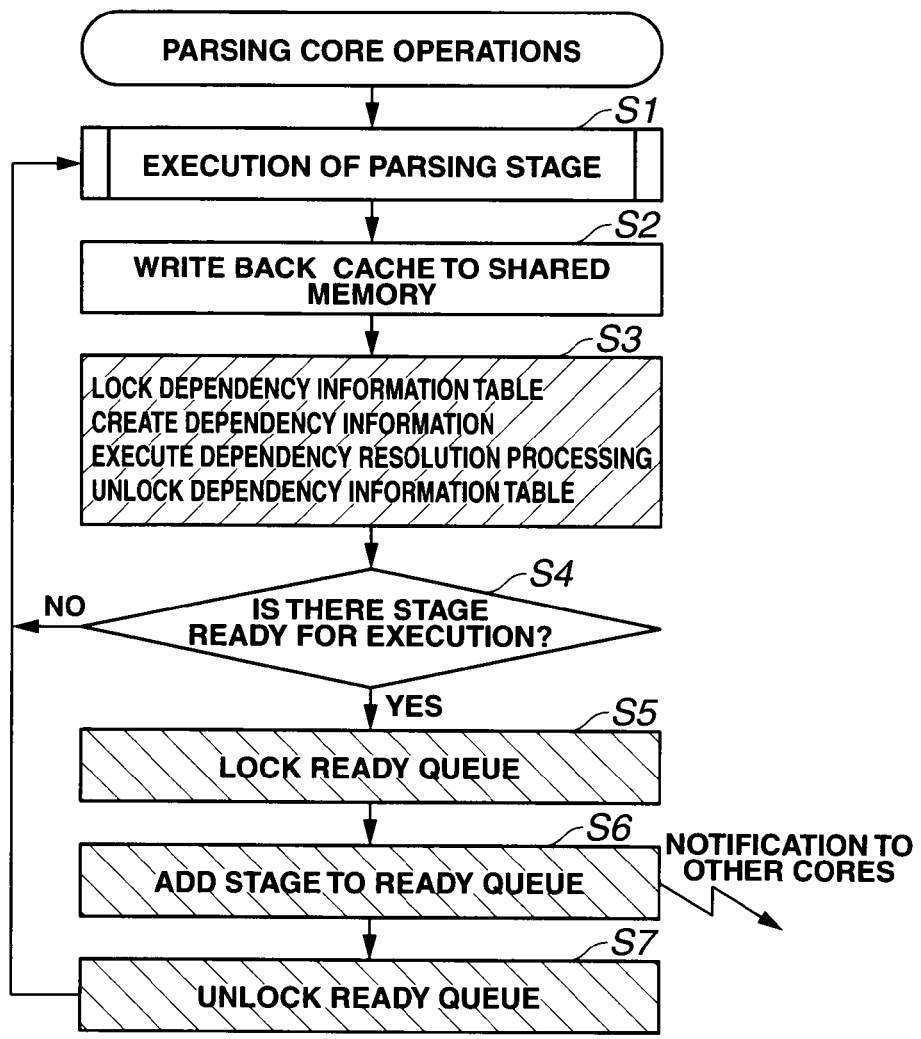
 : OPERATIONS BY DEPENDENCY RESOLVER
 : OPERATIONS BY READY QUEUE

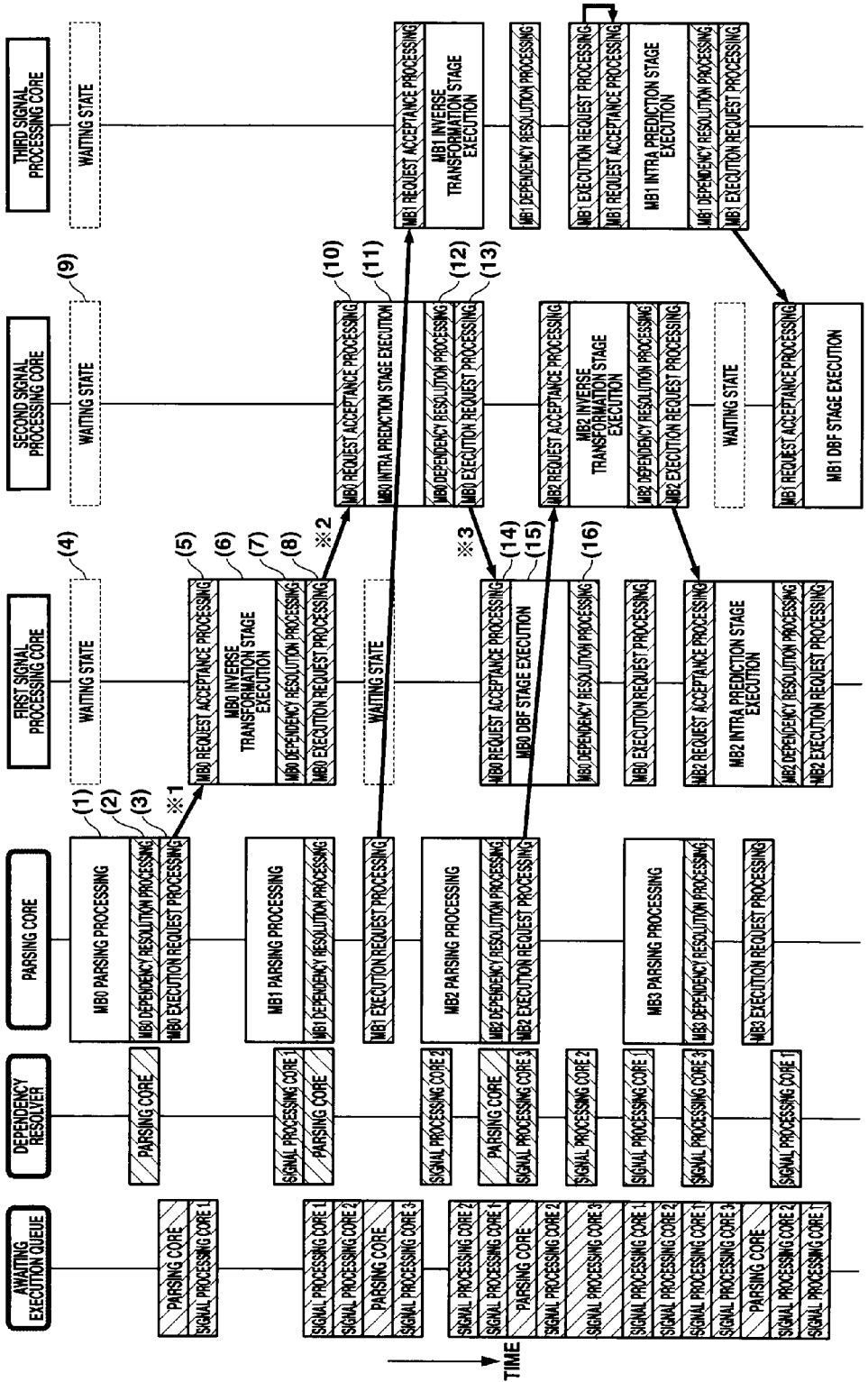

FIG.17

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION INCOMPLETE] | | | — | | [NOT YET SET] |
| MOTION COMPENSATION | PARSING CURRENT MB [EXECUTION INCOMPLETE] | | | — | | [NOT YET SET] |
| RESIDUE ADDITION | INVERSE TRANSFORMATION CURRENT MB [EXECUTION INCOMPLETE] | MOTION COMPENSATION CURRENT MB [EXECUTION INCOMPLETE] | | — | | [NOT YET SET] |
| INTRA PREDICTION | INVERSE TRANSFORMATION CURRENT MB [EXECUTION INCOMPLETE] | INTRA PREDICTION LEFT MB [EXECUTION INCOMPLETE] | INTRA PREDICTION UPPER MB [EXECUTION INCOMPLETE] | INTRA PREDICTION LEFT UPPER MB [EXECUTION INCOMPLETE] | INTRA PREDICTION RIGHT UPPER MB [EXECUTION INCOMPLETE] | [NOT YET SET] |
| DBF | RESIDUE ADDITION CURRENT MB [EXECUTION INCOMPLETE] | INTRA PREDICTION CURRENT MB [EXECUTION INCOMPLETE] | DBF LEFT MB [EXECUTION INCOMPLETE] | DBF UPPER MB [EXECUTION INCOMPLETE] | — | [NOT YET SET] |

FIG.18

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION INCOMPLETE] | — | | | | [VALID] |
| MOTION COMPENSATION | PARSING CURRENT MB [EXECUTION INCOMPLETE] | — | | | | [INVALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | — | | | [INVALID] |
| INTRA PREDICTION | INVERSE TRANSFORMATION CURRENT MB [EXECUTION INCOMPLETE] | INTRA PREDICTION LEFT MB [EXECUTION COMPLETED] | INTRA PREDICTION UPPER MB [EXECUTION COMPLETED] | INTRA PREDICTION LEFT UPPER MB [EXECUTION COMPLETED] | INTRA PREDICTION RIGHT UPPER MB [EXECUTION COMPLETED] | [VALID] |
| DBF | RESIDUE ADDITION CURRENT MB [EXECUTION COMPLETED] | INTRA PREDICTION CURRENT MB [EXECUTION INCOMPLETE] | DBF LEFT MB [EXECUTION COMPLETED] | DBF UPPER MB [EXECUTION COMPLETED] | — | [VALID] |

FIG.19

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION INCOMPLETE] | — | | | | [INVALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | — | | | [INVALID] |
| INTRA PREDICTION | INVERSE TRANSFORMATION CURRENT MB [EXECUTION INCOMPLETE] | INTRA PREDICTION LEFT MB [EXECUTION COMPLETED] | INTRA PREDICTION UPPER MB [EXECUTION COMPLETED] | INTRA PREDICTION LEFT UPPER MB [EXECUTION COMPLETED] | INTRA PREDICTION RIGHT UPPER MB [EXECUTION COMPLETED] | [VALID] |
| DBF | RESIDUE ADDITION CURRENT MB [EXECUTION COMPLETED] | INTRA PREDICTION CURRENT MB [EXECUTION INCOMPLETE] | DBF LEFT MB [EXECUTION COMPLETED] | DBF UPPER MB [EXECUTION COMPLETED] | — | [VALID] |

FIG.20

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION INCOMPLETE] | — | | | | [INVALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | — | | | [INVALID] |
| INTRA PREDICTION | INVERSE TRANSFORMATION CURRENT MB [EXECUTION COMPLETED] | INTRA PREDICTION LEFT MB [EXECUTION COMPLETED] | INTRA PREDICTION UPPER MB [EXECUTION COMPLETED] | INTRA PREDICTION LEFT UPPER MB [EXECUTION COMPLETED] | INTRA PREDICTION RIGHT UPPER MB [EXECUTION COMPLETED] | [VALID] |
| DBF | RESIDUE ADDITION CURRENT MB [EXECUTION COMPLETED] | INTRA PREDICTION CURRENT MB [EXECUTION INCOMPLETE] | DBF LEFT MB [EXECUTION COMPLETED] | DBF UPPER MB [EXECUTION COMPLETED] | — | [VALID] |

FIG.21

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION INCOMPLETE] | — | | | | [INVALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | — | | | [INVALID] |
| INTRA PREDICTION | INVERSE TRANSFORMATION CURRENT MB [EXECUTION COMPLETED] | INTRA PREDICTION LEFT MB [EXECUTION COMPLETED] | INTRA PREDICTION UPPER MB [EXECUTION COMPLETED] | INTRA PREDICTION LEFT UPPER MB [EXECUTION COMPLETED] | INTRA PREDICTION RIGHT UPPER MB [EXECUTION COMPLETED] | [VALID] |
| DBF | RESIDUE ADDITION CURRENT MB [EXECUTION COMPLETED] | INTRA PREDICTION CURRENT MB [EXECUTION COMPLETED] | DBF LEFT MB [EXECUTION COMPLETED] | DBF UPPER MB [EXECUTION COMPLETED] | — | [VALID] |

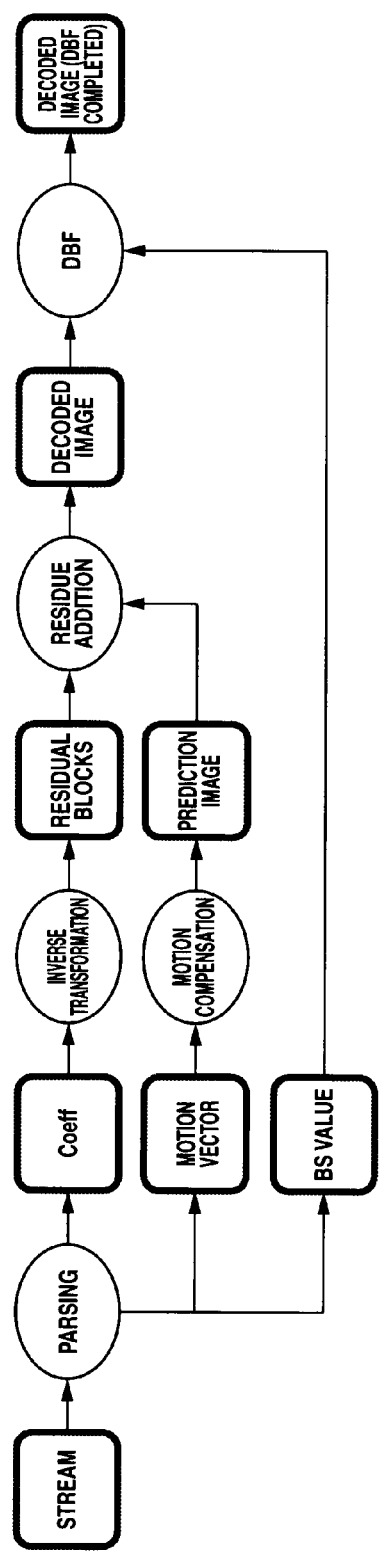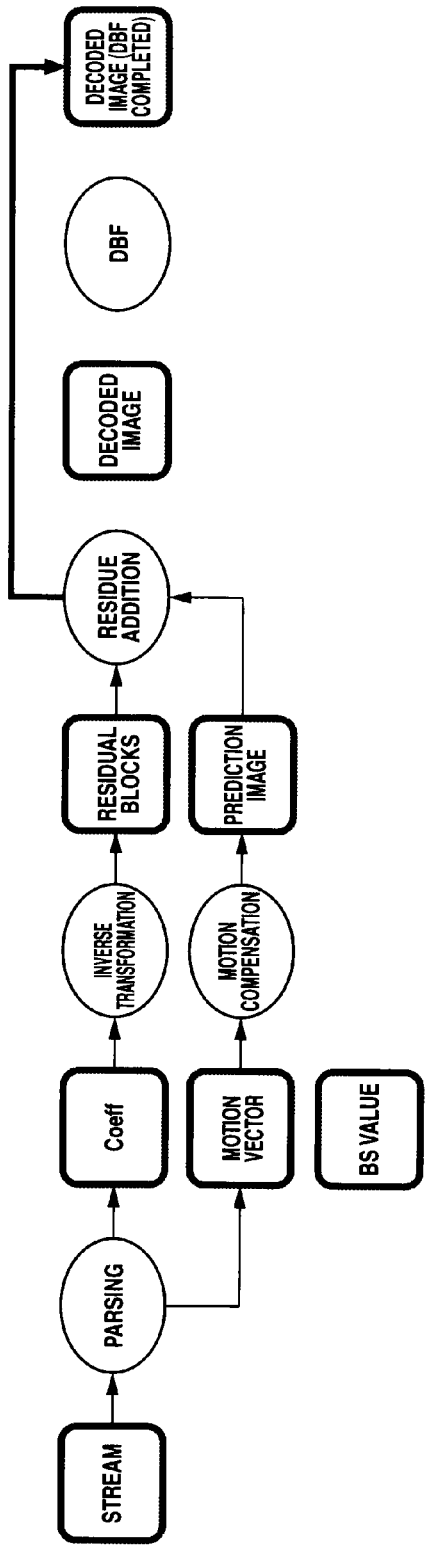

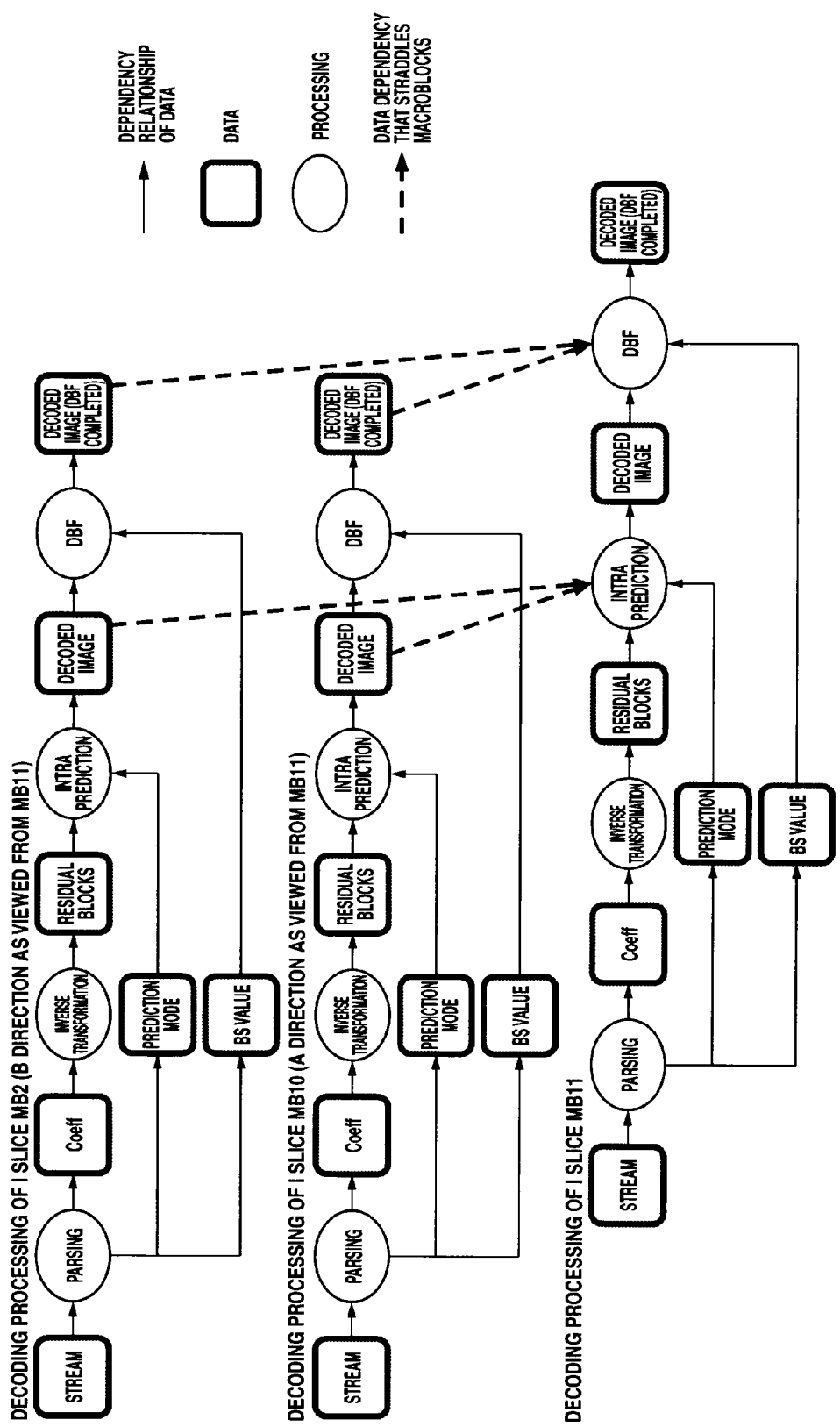

FIG.28

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION INCOMPLETE] | — | | | | [NOT YET SET] |
| MOTION COMPENSATION | PARSING CURRENT MB [EXECUTION INCOMPLETE] | | | | — | [NOT YET SET] |
| RESIDUE ADDITION | INVERSE TRANSFORMATION CURRENT MB [EXECUTION INCOMPLETE] | MOTION COMPENSATION CURRENT MB [EXECUTION INCOMPLETE] | | | — | [NOT YET SET] |
| INTRA PREDICTION | INVERSE TRANSFORMATION CURRENT MB [EXECUTION INCOMPLETE] | INTRA PREDICTION LEFT MB [EXECUTION INCOMPLETE] | INTRA PREDICTION UPPER MB [EXECUTION COMPLETED] | INTRA PREDICTION LEFT UPPER MB [EXECUTION INCOMPLETE] | INTRA PREDICTION RIGHT UPPER MB [EXECUTION INCOMPLETE] | [NOT YET SET] |
| DBF | RESIDUE ADDITION CURRENT MB [EXECUTION INCOMPLETE] | INTRA PREDICTION CURRENT MB [EXECUTION INCOMPLETE] | DBF LEFT MB [EXECUTION INCOMPLETE] | DBF UPPER MB [EXECUTION COMPLETED] | — | [NOT YET SET] |

FIG.29

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION INCOMPLETE] | — | | | | [VALID] |
| MOTION COMPENSATION | PARSING CURRENT MB [EXECUTION INCOMPLETE] | | | | — | [INVALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | | | — | [INVALID] |
| INTRA PREDICTION | INVERSE TRANSFORMATION CURRENT MB [EXECUTION INCOMPLETE] | INTRA PREDICTION LEFT MB [EXECUTION INCOMPLETE] | INTRA PREDICTION UPPER MB [EXECUTION COMPLETED] | INTRA PREDICTION LEFT UPPER MB [EXECUTION COMPLETED] | INTRA PREDICTION RIGHT UPPER MB [EXECUTION COMPLETED] | [VALID] |
| DBF | RESIDUE ADDITION CURRENT MB [EXECUTION COMPLETED] | INTRA PREDICTION CURRENT MB [EXECUTION INCOMPLETE] | DBF LEFT MB [EXECUTION INCOMPLETE] | DBF UPPER MB [EXECUTION COMPLETED] | — | [VALID] |

FIG.30

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION INCOMPLETE] | — | | | | [INVALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | — | | | [INVALID] |
| INTRA PREDICTION | INVERSE TRANSFORMATION CURRENT MB [EXECUTION INCOMPLETE] | INTRA PREDICTION LEFT MB [EXECUTION INCOMPLETE] | INTRA PREDICTION UPPER MB [EXECUTION COMPLETED] | INTRA PREDICTION LEFT UPPER MB [EXECUTION COMPLETED] | INTRA PREDICTION RIGHT UPPER MB [EXECUTION COMPLETED] | [VALID] |
| DBF | RESIDUE ADDITION CURRENT MB [EXECUTION COMPLETED] | INTRA PREDICTION CURRENT MB [EXECUTION INCOMPLETE] | DBF LEFT MB [EXECUTION INCOMPLETE] | DBF UPPER MB [EXECUTION COMPLETED] | — | [VALID] |

FIG.31

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION INCOMPLETE] | — | | | | [INVALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | — | | | [INVALID] |
| INTRA PREDICTION | INVERSE TRANSFORMATION CURRENT MB [EXECUTION COMPLETED] | INTRA PREDICTION LEFT MB [EXECUTION INCOMPLETE] | INTRA PREDICTION UPPER MB [EXECUTION COMPLETED] | INTRA PREDICTION LEFT UPPER MB [EXECUTION COMPLETED] | INTRA PREDICTION RIGHT UPPER MB [EXECUTION COMPLETED] | [VALID] |
| DBF | RESIDUE ADDITION CURRENT MB [EXECUTION COMPLETED] | INTRA PREDICTION CURRENT MB [EXECUTION INCOMPLETE] | DBF LEFT MB [EXECUTION INCOMPLETE] | DBF UPPER MB [EXECUTION COMPLETED] | — | [VALID] |

FIG.32

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION INCOMPLETE] | — | | | | [INVALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | — | | | [INVALID] |
| INTRA PREDICTION | INVERSE TRANSFORMATION CURRENT MB [EXECUTION COMPLETED] | INTRA PREDICTION LEFT MB [EXECUTION COMPLETED] | INTRA PREDICTION UPPER MB [EXECUTION COMPLETED] | INTRA PREDICTION LEFT UPPER MB [EXECUTION COMPLETED] | INTRA PREDICTION RIGHT UPPER MB [EXECUTION COMPLETED] | [VALID] |
| DBF | RESIDUE ADDITION CURRENT MB [EXECUTION COMPLETED] | INTRA PREDICTION CURRENT MB [EXECUTION INCOMPLETE] | DBF LEFT MB [EXECUTION INCOMPLETE] | DBF UPPER MB [EXECUTION COMPLETED] | — | [VALID] |

FIG.33

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION INCOMPLETE] | — | | | | [INVALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | — | | | [INVALID] |
| INTRA PREDICTION | INVERSE TRANSFORMATION CURRENT MB [EXECUTION COMPLETED] | INTRA PREDICTION LEFT MB [EXECUTION COMPLETED] | INTRA PREDICTION UPPER MB [EXECUTION COMPLETED] | INTRA PREDICTION LEFT UPPER MB [EXECUTION COMPLETED] | INTRA PREDICTION RIGHT UPPER MB [EXECUTION COMPLETED] | [VALID] |
| DBF | RESIDUE ADDITION CURRENT MB [EXECUTION COMPLETED] | INTRA PREDICTION CURRENT MB [EXECUTION COMPLETED] | DBF LEFT MB [EXECUTION INCOMPLETE] | DBF UPPER MB [EXECUTION COMPLETED] | — | [VALID] |

FIG.34

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION INCOMPLETE] | — | | | | [INVALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | — | | | [INVALID] |
| INTRA PREDICTION | INVERSE TRANSFORMATION CURRENT MB [EXECUTION COMPLETED] | INTRA PREDICTION LEFT MB [EXECUTION COMPLETED] | INTRA PREDICTION UPPER MB [EXECUTION COMPLETED] | INTRA PREDICTION LEFT UPPER MB [EXECUTION COMPLETED] | INTRA PREDICTION RIGHT UPPER MB [EXECUTION COMPLETED] | [VALID] |
| DBF | RESIDUE ADDITION CURRENT MB [EXECUTION COMPLETED] | INTRA PREDICTION CURRENT MB [EXECUTION COMPLETED] | DBF LEFT MB [EXECUTION COMPLETED] | DBF UPPER MB [EXECUTION COMPLETED] | — | [VALID] |

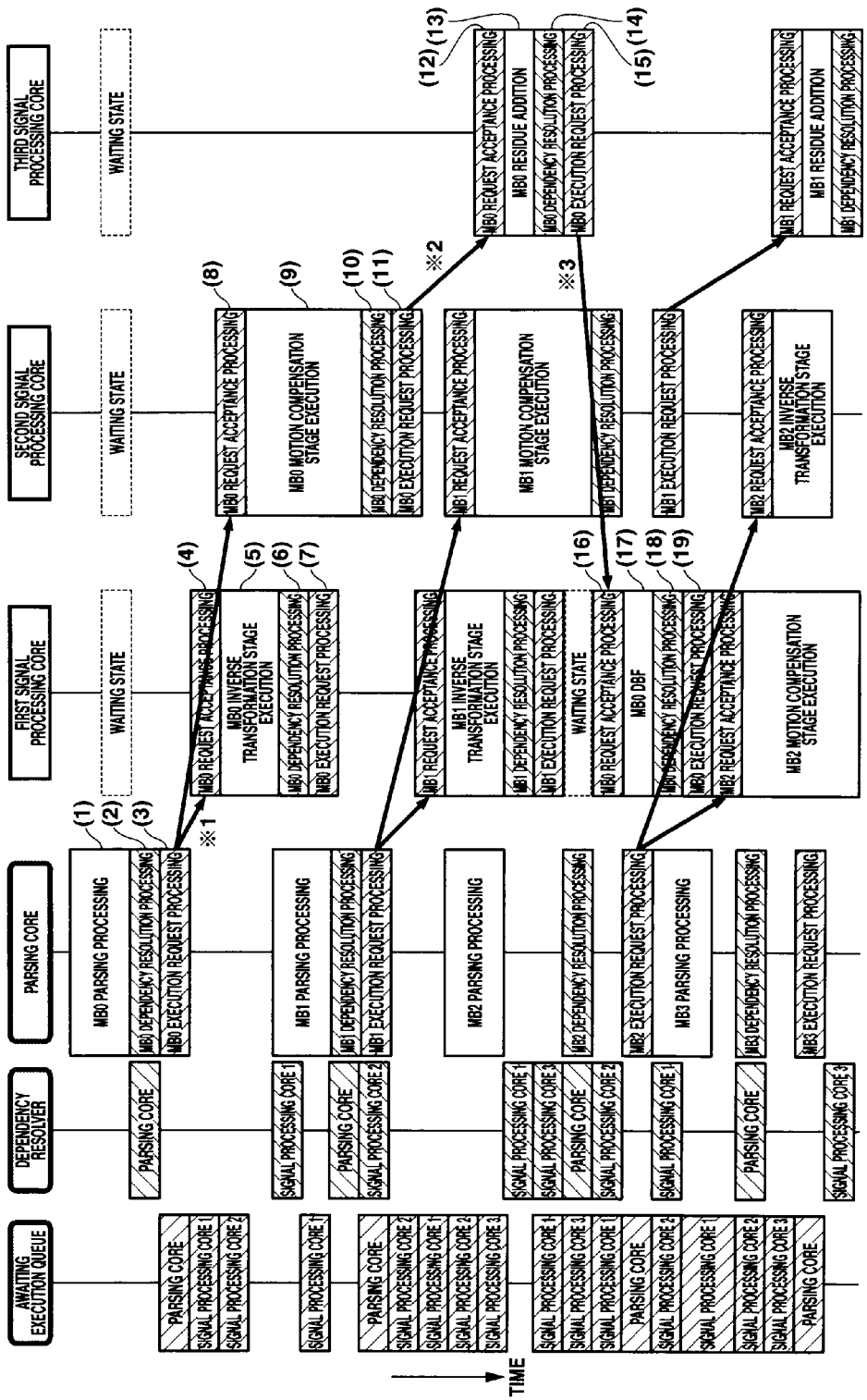

FIG.37

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION INCOMPLETE] | | | — | | [NOT YET SET] |
| MOTION COMPENSATION | PARSING CURRENT MB [EXECUTION INCOMPLETE] | | | — | | [NOT YET SET] |
| RESIDUE ADDITION | INVERSE TRANSFORMATION CURRENT MB [EXECUTION INCOMPLETE] | MOTION COMPENSATION CURRENT MB [EXECUTION INCOMPLETE] | | — | | [NOT YET SET] |
| INTRA PREDICTION | INVERSE TRANSFORMATION CURRENT MB [EXECUTION INCOMPLETE] | INTRA PREDICTION LEFT MB [EXECUTION INCOMPLETE] | INTRA PREDICTION UPPER MB [EXECUTION INCOMPLETE] | INTRA PREDICTION LEFT UPPER MB [EXECUTION INCOMPLETE] | INTRA PREDICTION RIGHT UPPER MB [EXECUTION INCOMPLETE] | [NOT YET SET] |
| DBF | RESIDUE ADDITION CURRENT MB [EXECUTION INCOMPLETE] | INTRA PREDICTION CURRENT MB [EXECUTION INCOMPLETE] | DBF LEFT MB [EXECUTION INCOMPLETE] | DBF UPPER MB [EXECUTION INCOMPLETE] | — | [NOT YET SET] |

FIG.38

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION INCOMPLETE] | | | — | | [VALID] |
| MOTION COMPENSATION | PARSING CURRENT MB [EXECUTION INCOMPLETE] | | | — | | [VALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | | — | | [VALID] |
| INTRA PREDICTION | INVERSE TRANSFORMATION CURRENT MB [EXECUTION INCOMPLETE] | INTRA PREDICTION LEFT MB [EXECUTION INCOMPLETE] | INTRA PREDICTION UPPER MB [EXECUTION INCOMPLETE] | INTRA PREDICTION LEFT UPPER MB [EXECUTION INCOMPLETE] | INTRA PREDICTION RIGHT UPPER MB [EXECUTION INCOMPLETE] | [INVALID] |
| DBF | RESIDUE ADDITION CURRENT MB [EXECUTION INCOMPLETE] | INTRA PREDICTION CURRENT MB [EXECUTION COMPLETED] | DBF LEFT MB [EXECUTION COMPLETED] | DBF UPPER MB [EXECUTION COMPLETED] | — | [VALID] |

FIG.39

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION COMPLETED] | — | | | | [VALID] |
| RESIDUE ADDITION | INVERSE TRANSFORMATION CURRENT MB [EXECUTION INCOMPLETE] | MOTION COMPENSATION CURRENT MB [EXECUTION INCOMPLETE] | — | | | [VALID] |
| INTRA PREDICTION | INVERSE TRANSFORMATION CURRENT MB [EXECUTION INCOMPLETE] | INTRA PREDICTION LEFT MB [EXECUTION INCOMPLETE] | INTRA PREDICTION UPPER MB [EXECUTION INCOMPLETE] | INTRA PREDICTION LEFT UPPER MB [EXECUTION INCOMPLETE] | INTRA PREDICTION RIGHT UPPER MB [EXECUTION INCOMPLETE] | [INVALID] |
| DBF | RESIDUE ADDITION CURRENT MB [EXECUTION INCOMPLETE] | INTRA PREDICTION CURRENT MB [EXECUTION COMPLETED] | DBF LEFT MB [EXECUTION COMPLETED] | DBF UPPER MB [EXECUTION COMPLETED] | — | [VALID] |

FIG.40

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION COMPLETED] | — | | | | [VALID] |
| RESIDUE ADDITION | INVERSE TRANSFORMATION CURRENT MB [EXECUTION COMPLETED] | MOTION COMPENSATION CURRENT MB [EXECUTION INCOMPLETE] | — | | | [VALID] |
| INTRA PREDICTION | INVERSE TRANSFORMATION CURRENT MB [EXECUTION INCOMPLETE] | INTRA PREDICTION LEFT MB [EXECUTION INCOMPLETE] | INTRA PREDICTION UPPER MB [EXECUTION INCOMPLETE] | INTRA PREDICTION LEFT UPPER MB [EXECUTION INCOMPLETE] | INTRA PREDICTION RIGHT UPPER MB [EXECUTION INCOMPLETE] | [INVALID] |
| DBF | RESIDUE ADDITION CURRENT MB [EXECUTION INCOMPLETE] | INTRA PREDICTION CURRENT MB [EXECUTION COMPLETED] | DBF LEFT MB [EXECUTION COMPLETED] | DBF UPPER MB [EXECUTION COMPLETED] | — | [VALID] |

FIG.41

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION COMPLETED] | — | | | | [VALID] |
| RESIDUE ADDITION | INVERSE TRANSFORMATION CURRENT MB [EXECUTION COMPLETED] | MOTION COMPENSATION CURRENT MB [EXECUTION COMPLETED] | — | | | [VALID] |
| INTRA PREDICTION | INVERSE TRANSFORMATION CURRENT MB [EXECUTION INCOMPLETE] | INTRA PREDICTION LEFT MB [EXECUTION INCOMPLETE] | INTRA PREDICTION UPPER MB [EXECUTION INCOMPLETE] | INTRA PREDICTION LEFT UPPER MB [EXECUTION INCOMPLETE] | INTRA PREDICTION RIGHT UPPER MB [EXECUTION INCOMPLETE] | [INVALID] |
| DBF | RESIDUE ADDITION CURRENT MB [EXECUTION INCOMPLETE] | INTRA PREDICTION CURRENT MB [EXECUTION COMPLETED] | DBF LEFT MB [EXECUTION COMPLETED] | DBF UPPER MB [EXECUTION COMPLETED] | — | [VALID] |

FIG.42

| STAGE ITEM | DEPENDENCY ORIGIN STAGE EXECUTION COMPLETION INFORMATION | | | | | STAGE VALID/INVALID |
|---|---|---|---|---|---|---|
| INVERSE TRANSFORMATION | PARSING CURRENT MB [EXECUTION COMPLETED] | — | | | | [VALID] |
| MOTION COMPENSATION | PARSING CURRENT MB [EXECUTION COMPLETED] | — | | | | [VALID] |
| RESIDUE ADDITION | INVERSE TRANSFORMATION CURRENT MB [EXECUTION COMPLETED] | MOTION COMPENSATION CURRENT MB [EXECUTION COMPLETED] | — | | | [VALID] |
| INTRA PREDICTION | INVERSE TRANSFORMATION CURRENT MB [EXECUTION INCOMPLETE] | INTRA PREDICTION LEFT MB [EXECUTION INCOMPLETE] | INTRA PREDICTION UPPER MB [EXECUTION INCOMPLETE] | INTRA PREDICTION LEFT UPPER MB [EXECUTION INCOMPLETE] | INTRA PREDICTION RIGHT UPPER MB [EXECUTION INCOMPLETE] | [INVALID] |
| DBF | RESIDUE ADDITION CURRENT MB [EXECUTION COMPLETED] | INTRA PREDICTION CURRENT MB [EXECUTION COMPLETED] | DBF LEFT MB [EXECUTION COMPLETED] | DBF UPPER MB [EXECUTION COMPLETED] | — | [VALID] |

MEMORY MANAGEMENT SYSTEM AND IMAGE PROCESSING APPARATUS

CROSS REFERENCE TO RELATED APPLICATION

This application is based upon and claims the benefit of priority from the prior Japanese Patent Application No. 2007-41301 filed on Feb. 21, 2007; the entire contents of which are incorporated herein by this reference.

BACKGROUND OF THE INVENTION

1. Field of the Invention

The present invention relates to a memory management system and an image processing apparatus that enable efficient management of a cache memory in a multiprocessor system having a plurality of processors, a cache memory, and a shared memory.

2. Description of the Related Art

To improve the processing performance of a processor, a cache memory that enables high speed access is provided between a main memory (main storage area) that has a slow working speed and the processor, to thereby reduce the frequency at which the processor accesses the main memory.

The systems for writing data to a cache memory include a write through system and a write back system. The write through system is a system that writes to both the cache memory and the main memory when a write to the main memory occurs.

The write back system is a system in which, when a write to the main memory occurs, writing is first performed to only the cache memory, and then writing is performed to the main memory. Since the write back system can shorten the write time in addition to the readout time, it can make full use of the high speed properties of a cache memory. However, in the write back system it is necessary to execute control to maintain the coherency of data between the cache memory and the main memory. For example, when flushing (releasing) data of the cache memory and the like, it is necessary to write back the data of the cache memory to the main memory after invalidating the cache memory.

As technology that shortens the time required for invalidation when invalidating a cache memory, a cache memory device has been proposed that sequentially reads out the tag addresses of all cache lines using a counter that generates a line index, checks whether the tag addresses correspond to the range of set addresses, and invalidates the corresponding cache lines.

In a multi-core system that includes a plurality of microprocessors, when a cache memory is provided for each of the cores it is necessary to provide a mechanism that maintains the coherency of data between a shared memory and a cache memory and between a cache memory and a cache memory. Cache management technology that is directed at a common multi-core system has been proposed, such as in Japanese Patent Laid-Open No. 2005-148771, that incorporates a mechanism that manages an exclusive access as well as a shared state.

However, with respect to a data access pattern in image processing, since a characteristic that specification is possible based on information such as parameters is not utilized prior to actually accessing the data because of the characteristic that image processing is data flow processing (in particular, with respect to decoding processing of dynamic images), the spatial locality and temporal locality of memory accesses of an image processing program can not be adequately utilized. Therefore, there is a problem that the utilization efficiency of the cache memory is lowered.

As a method to compensate for a lowering in the utilization efficiency of the cache memory, technology for obtaining cache information and finding any duplication of the cache information based on image block information also exists to thereby improve the utilization efficiency. However, when hardware for making a duplication decision is used in a multi-core system with more than four cores it is necessary to provide hardware that detects duplication for combinations of 4×4=16, and thus the technology cannot be utilized because the scale increases.

SUMMARY OF THE INVENTION

According to one aspect of the present invention, there is provided a memory management system including a plurality of processors, a shared memory that can be accessed from the plurality of processors, a cache memory that is provided between the shared memory and each processor of the plurality of processors that can be commanded to invalidate and write back a specified region by a program running on a processor, wherein programs running on the respective processors invalidate an input data region storing input data in the cache memory using an invalidation command of a specified region immediately before execution of a program that is a processing batch, and write back an output data region that stores output data in the cache memory to the shared memory using a write back command for a specified region immediately after execution of a program that is a processing batch.

According to another aspect of the present invention, there is provided a memory management system including a plurality of processors; a shared memory that can be accessed from the plurality of processors; and a cache memory that is provided between the shared memory and each processor of the plurality of processors, and with respect to which invalidation and write back of a specified region can be commanded from a program running on a processor; wherein: the shared memory includes a dependency information table that controls an execution sequence of programs, and a queue that stores programs of processing batches that are judged to be ready for execution based on dependency resolution processing according to the dependency information table; the programs are operated with respect to programs of processing batches that run on a plurality of processors, such that programs of processing batches that are not in a dependency relationship with each other are run at the same time and programs of processing batches that are in a dependency relationship with each other are not run at the same time by using the dependency information table and the queue; and to enable coherency between contents of the cache memory and contents of the shared memory when the respective processors write data to the cache memory, the program issues a command for invalidation and for write back, respectively, at respective timings immediately before execution and immediately after execution of a program of a processing batch.

According to a further aspect of the present invention, there is provided an image processing apparatus that includes a parsing processor that performs parsing based on an image encoding stream that is input and extracts parameters required to perform decoding; at least one signal processing processor for performing image signal processing based on parameters that are extracted to generate a decoded image; cache memories that are provided in correspondence with the parsing processor and the signal processing processor, respectively, which can be referred to only from the respectively corresponding processor and with respect to invalidation and write back of a specified region can be commanded from a program running on a processor; and a shared memory that can be referred to from all of the processors consisting of the parsing processor and the signal processing processor and which stores a program that runs on a processor; wherein programs running on the respective processors invalidate an input data region storing input data in the cache memory using an invalidation command of a specified region immediately before execution of a program as a processing batch, and write back an output data region that stores output data in the cache memory to the shared memory using a write back command for a specified region immediately after execution of a program as a processing batch.

BRIEF DESCRIPTION OF THE DRAWINGS

FIG. 2 is a flowchart that illustrates operations of a host task (parsing core operations);

FIG. 16 is a view that illustrates a sequence (I slice MB0 vicinity) of the decoding processing shown in FIG. 15;

FIG. 17 is a view that illustrates the initial state of an MB0 dependency information table;

FIG. 18 is a view that illustrates a state of the MB0 dependency information table after dependency information creation;

FIG. 19 is a view that illustrates a state of the MB0 dependency information table after parsing dependency resolution processing;

FIG. 20 is a view that illustrates a state of the MB0 dependency information table after dependency resolution processing with respect to inverse transformation;

FIG. 21 is a view that illustrates a state of the MB0 dependency information table after dependency resolution processing with respect to MB0 intra prediction;

FIGS. 23A and 23B are views that illustrate decoding processing of I slice MB0 in a case in which DFB processing is enabled and a case in which DFB processing is disabled, based on the header information of a stream;

FIG. 26 is a view that illustrates [decoding processing contents of I slice MB11] in a memory management system according to the second embodiment of the present invention;

FIG. 28 is a view that illustrates a state of the MB11 dependency information table before dependency information creation;

FIG. 29 is a view that illustrates a state of the MB11 dependency information table after dependency information creation;

FIG. 30 is a view that illustrates a state of the MB11 dependency information table after parsing dependency resolution processing;

FIG. 31 is a view that illustrates a state of the MB11 dependency information table after dependency resolution processing with respect to inverse transformation;

FIG. 32 is a view that illustrates a state of the MB11 dependency information table after dependency resolution processing with respect to intra prediction;

FIG. 33 is a view that illustrates a state of the MB11 dependency information table after dependency resolution processing with respect to intra prediction;

FIG. 34 is a view that illustrates a state of the MB11 dependency information table after dependency resolution processing with respect to intra prediction;

FIG. 36 is a view that illustrates a sequence (MB0 vicinity of P slice) in the P slice MB0 decoding processing shown in FIG. 35;

FIG. 37 is a view that illustrates the initial state of an MB0 dependency information table;

FIG. 38 is a view that illustrates a state of the MB0 dependency information table after dependency information creation;

FIG. 39 is a view that illustrates a state of the MB0 dependency information table after parsing dependency resolution processing;

FIG. 40 is a view that illustrates a state of the MB0 dependency information table after dependency resolution processing with respect to MB0 inverse transformation;

FIG. 41 is a view that illustrates a state of the MB0 dependency information table after dependency resolution processing with respect to MB0 motion compensation; and FIG. 42 is a view that illustrates a state of the MB0 dependency information table after dependency resolution processing with respect to MB0 residue addition.

DETAILED DESCRIPTION OF THE PREFERRED EMBODIMENTS

Embodiments of the present invention are described hereunder with reference to the attached drawings.

First Embodiment

Figure 1:
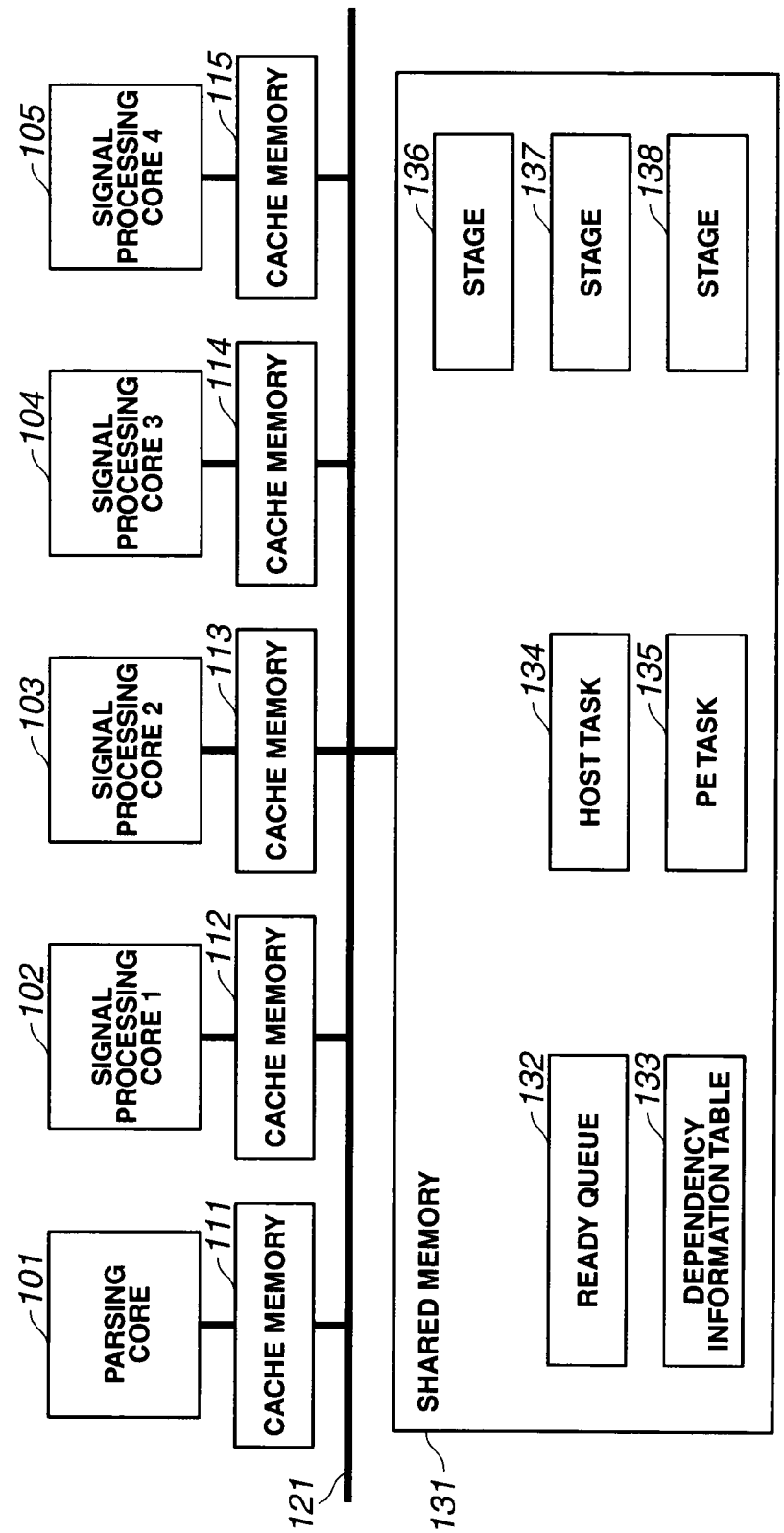
FIG. 1 is a block diagram of an image processing apparatus to which a memory management system according to a first embodiment of the present invention is applied.
Figure 3:
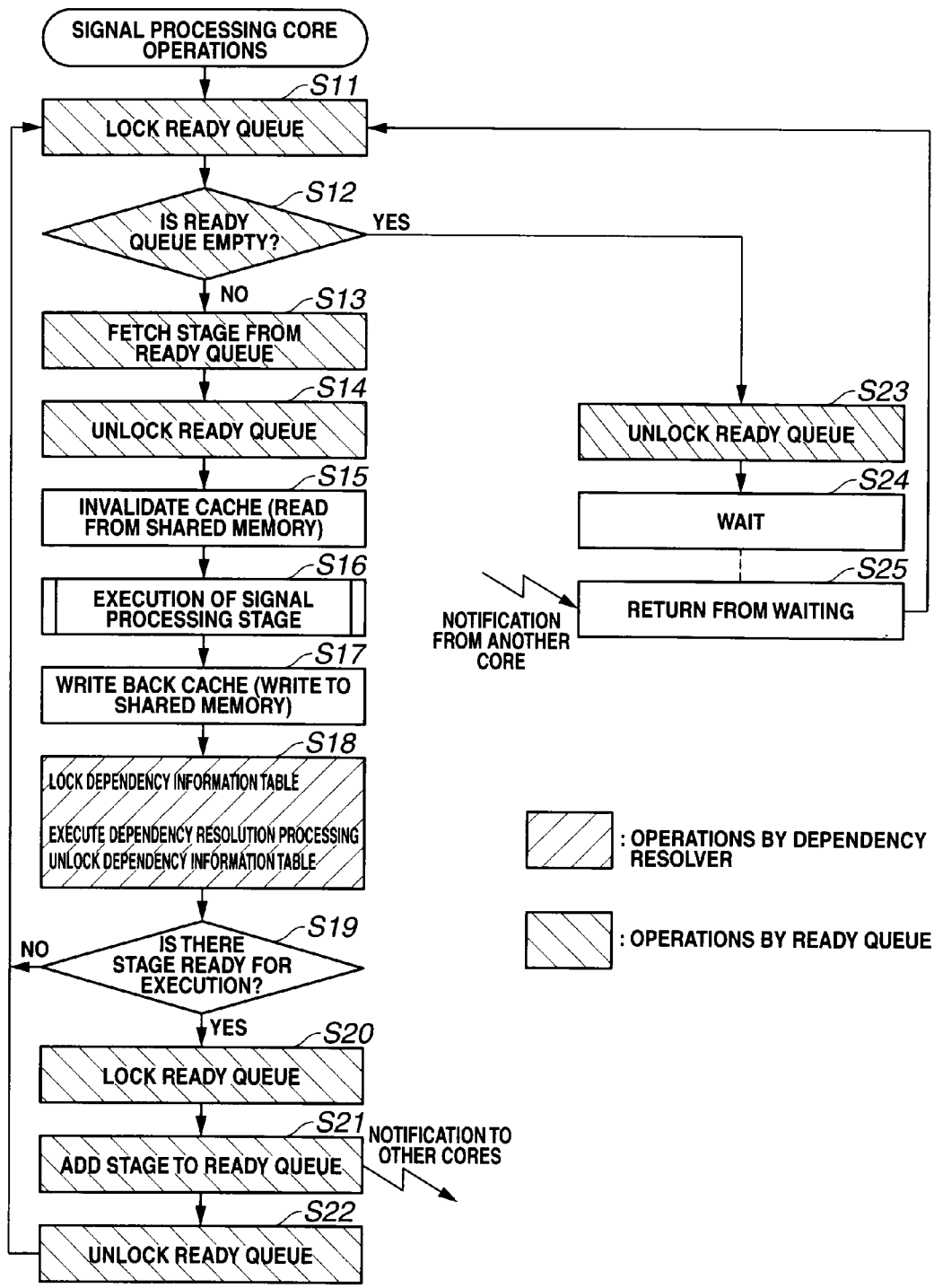
FIG. 3 is a flowchart that illustrates operations of a PE task (signal processing core operations)
Figure 4:
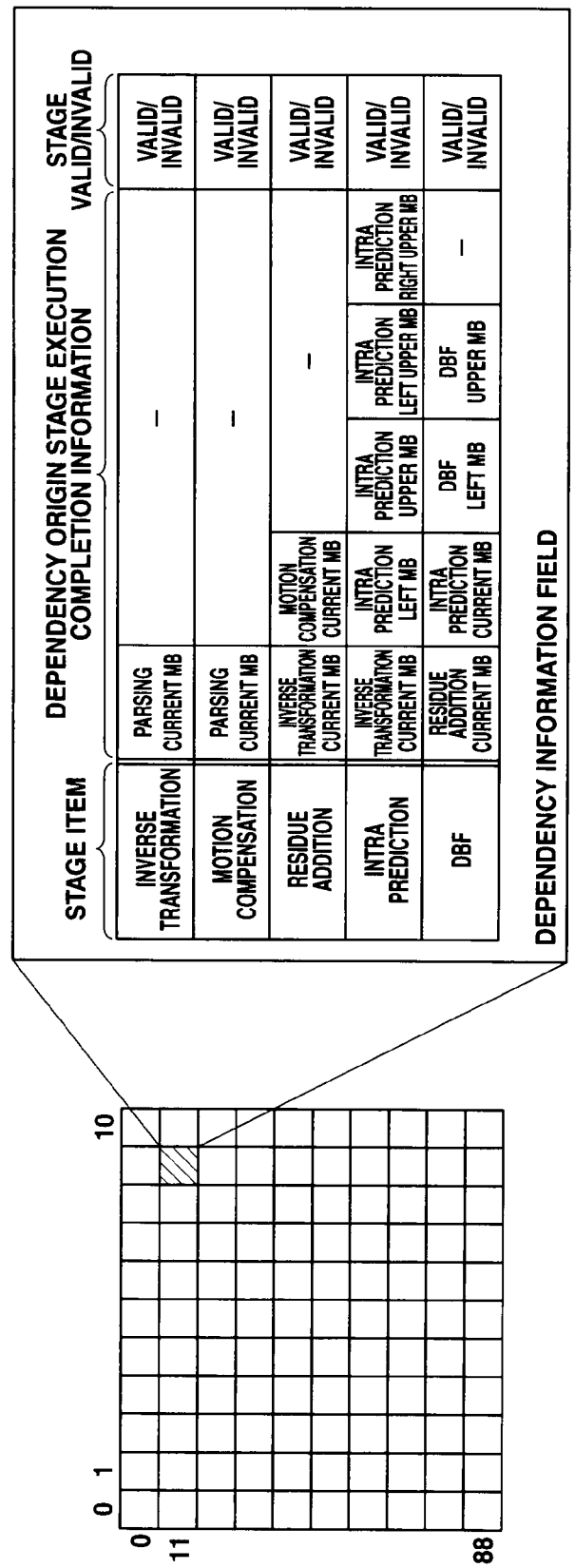
FIG. 4 is a view that shows a dependency information table.
Figure 5:
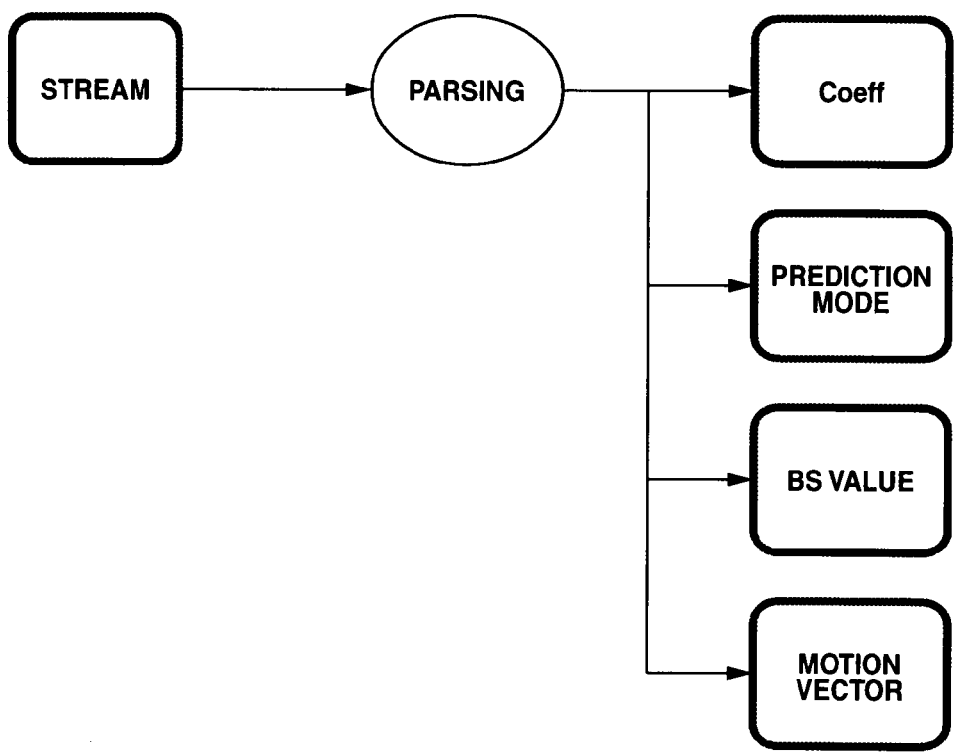
FIG. 5 is a view that illustrates parsing processing of a stream.
Figure 6:
FIG. 6 is a view that illustrates a signal processing stage of inverse transformation.
Figure 7:
FIG. 7 is a view that illustrates a signal processing stage of motion compensation.
Figure 8:
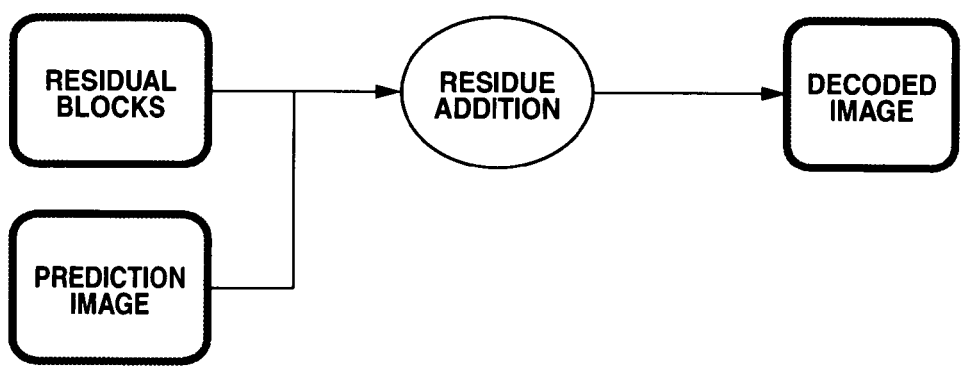
FIG. 8 is a view that illustrates a signal processing stage of residue addition.
Figure 9:
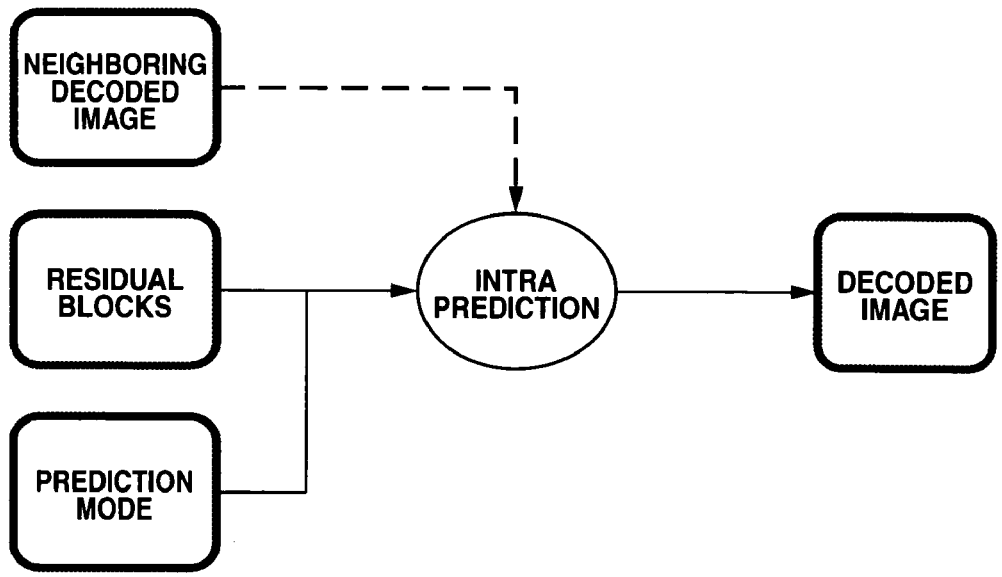
FIG. 9 is a view that illustrates a signal processing stage of intra prediction.
Figure 10:
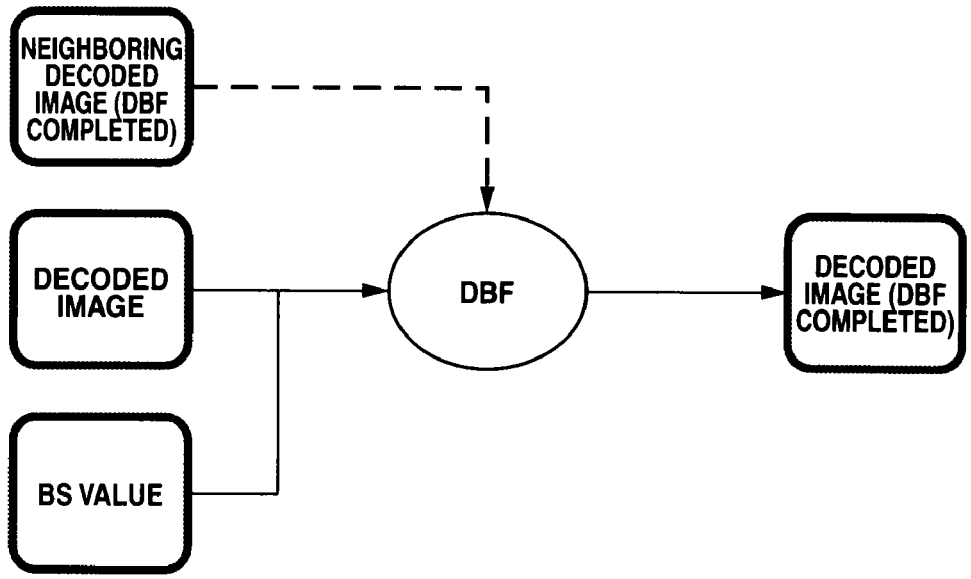
FIG. 10 is a view that illustrates a signal processing stage of applying a deblocking filter (DBF)

FIG. 1 is a block diagram of an image processing apparatus to which a memory management system according to a first embodiment of the present invention is applied. FIG. 2 is a flowchart that describes operations of a host task (parsing core operations). FIG. 3 is a flowchart that describes operations of a PE task (signal processing core operations). FIG. 4 is a view that shows a dependency information table. FIG. 5 is a view that illustrates parsing processing of a stream. FIG. 6 is a view that illustrates a signal processing stage of inverse transformation. FIG. 7 is a view that illustrates a signal processing stage of motion compensation. FIG. 8 is a view that illustrates a signal processing stage of residue addition. FIG. 9 is a view that illustrates a signal processing stage of intra prediction, and FIG. 10 is a view that illustrates a signal processing stage of applying a deblocking filter (DBF).

The image processing apparatus is a decoder that receives an image that is encoded into an image encoding stream as an input, and that outputs a decoded image that can be displayed.

The image processing apparatus has a function as a decoder that acquires image data encoded in a bit stream as input data and outputs displayable decoded image data to a predetermined output device (for example, a liquid crystal display), and includes a parsing core 101, a first signal processing core 102, a second signal processing core 103, a third signal processing core 104, a fourth signal processing core 105, cache memories 111 to 115, and a shared memory 131. Each of these components is connected through a bus (or interconnect) 121.

The parsing core 101, the first signal processing core 102, the second signal processing core 103, the third signal processing core 104, and the fourth signal processing core 105 are processors. The cache memory 111 is a cache memory for the parsing core 110. Likewise, the cache memory 112 is a cache memory for the first signal processing core 102, the cache memory 113 is a cache memory for the second signal processing core 103, the cache memory 114 is a cache memory for the third signal processing core 104, and the cache memory 115 is a cache memory for the fourth signal processing core 105. Although a configuration having the five processors consisting of the parsing core 101, the first signal processing core 102, the second signal processing core 103, the third signal processing core 104, and the fourth signal processing core 105 is illustrated according to the present embodiment, a configuration having an arbitrary number of processors can be adopted as along as it does not depart from the spirit and scope of the present invention.

The shared memory 131 is a common memory that can be accessed from the aforementioned plurality of cores (parsing core 101, first signal processing core 102, second signal processing core 103, third signal processing core 104, fourth signal processing core 105). The shared memory 131 stores a ready queue 132, a dependency information table 133, a host task 134, a processing elements task (hereunder, referred to as "PE task") 135, stages 136 to 138 as program modules of image processing contents, and other various kinds of data.

The ready queue 132 is a list in which commands (information) are written regarding which image processing should be performed (that is, which stage should be activated), in which the queue structure (first-in first-out) is written as a data row. According to the present embodiment, a stage is registered (stored) as a program of a processing batch that is ready for execution (dependency relation with other signal processing is resolved).

Figure 13:
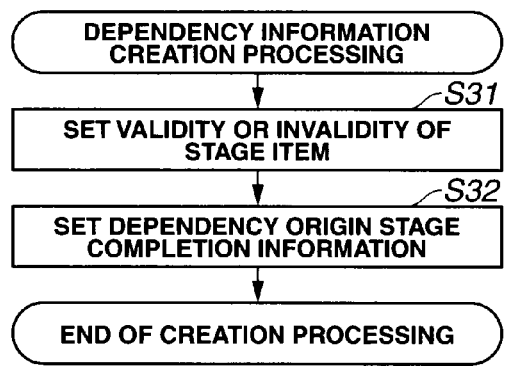
FIG. 13 is a flowchart of dependency information creation processing.

The dependency information table 133 is information that is created in dependency information creation processing (see FIG. 13). The dependency information table 133 includes, for each macroblock (MB), a table of dependency information (see FIG. 4) that includes the resolution situation with respect to dependency relations between parsing processing or other signal processing (stages) (whether or not input data required for a certain image processing has been output as output data of parsing processing or other signal processing) (see FIG. 14) for a certain image processing.

The host task 134 is a program module for performing host task processing (see FIG. 2) that submits a stage execution request (adds a stage to the queue 132). The host task 134 is activated by the parsing core 101.

The PE task 135 is a program module for performing PE task processing (see FIG. 3) that accepts an execution request for a stage that is performed in the host task processing to execute image processing and also submits an execution request for a different stage (adds a different stage to the queue 132). The PE task 135 is activated by each of the first signal processing core 102 to the fourth signal processing core 105, respectively.

The stages 136 to 138 are program modules for performing a signal processing stage (see FIG. 6 to FIG. 10) that is stored in the ready queue 132. The stages 136 to 138 are activated by each of the first signal processing core 102 to the fourth signal processing core 105, respectively.

In the above configuration, an image encoding stream that is input is subjected to parsing at the parsing core 101, and after required parameters (see [parsing processing] shown in FIG. 5) are extracted and the parameters are written in a cache memory, the image encoding stream is written in the shared memory 131. Subsequently, the host task shown in FIG. 2 is performed, creation processing of the dependency information table 133 shown in FIG. 4 and dependency resolution processing are performed using the results of parsing, and if there is an executable stage for which a dependency relation with another signal processing has been resolved, registration is performed by storage thereof in the ready queue 132. Thereafter, image processing (decoding processing) is performed by sending an execution request from the host task 134 to the PE task 135 to have the PE task 135 to execute the respective stages, and decoded image data that can be displayed is output.

Therefore, according to the present embodiment, to enable processing of a large amount of information at high speed, an image processing apparatus has a plurality of cores including the parsing core 101 and the first signal processing core 102 to the fourth signal processing core 105, and a shared memory 131 that can be accessed from the first signal processing core 102 to the fourth signal processing core 105. Further, the respective cores among the plurality of cores are equipped with cache memories 111 to 115 for which invalidation and write back of a specified region can be instructed from a program running on the respective core. The shared memory 131 is equipped with the dependency information table 133 that controls the execution sequence of programs, and the queue 132 that stores programs (=stages) of processing batches that are judged as ready for execution based on dependency resolution processing according to the dependency information table. A feature of this configuration is that, by using the dependency information table 133 and the queue 132, programs are operated with respect to programs of processing batches that run on a plurality of cores, such that programs of processing batches that are not in a dependency relationship with each other are run at the same time and programs of processing batches that are in a dependency relationship with each other are not run at the same time, and that, to enable coherency between contents of the cache memories and contents of the shared memory when the respective cores write data to a cache memory, a program issues a command for invalidation and for write back, respectively, at respective timings immediately before execution and immediately after execution of a program of a processing batch.

This configuration is described in further detail hereunder.

The image processing apparatus is constituted by two sections: a parsing processing section that performs parsing based on an image encoding stream to extract parameters required to perform decoding; and a signal processing section that performs signal processing calculations based on the extracted parameters to calculate a decoded image.

The parsing processing section and the signal processing section operate on a computing machine system configured by the parsing core 101 that has a primary purpose of executing parsing processing, the first signal processing core 102, the second signal processing core 103, the third signal processing core 104, and the fourth signal processing core 105 that have a primary purpose of executing image signal processing, the cache memories 111 to 115 that are provided in correspondence with the core 101 to 105, respectively, and which can be referred to only from each corresponding core, the shared memory 131 that is accessible from all of the cores, the bus (or interconnect) 121 that connects the above components, and hardware devices (not illustrated) such as a test-and-set device and semaphore device for performing exclusive control. In this connection, the term "exclusive control" refers to control that prevents reading or writing from or to a core other than the core that is being processed with respect to a program module for which image processing is being executed. Setting of exclusive control is referred to as "lock", and invalidation (release) of exclusive control is referred to as "unlock".

Stages 136 to 138 that are program modules for which procedures required for parsing processing and image signal processing are split into units in which input/output are clear, the host task 134 that is a program module that runs on the parsing core 101 and requests execution of stages 136 to 138, and the PE task 135 that is a program module that runs on the first signal processing core 102 to the fourth signal processing core 105 and has a function that accepts execution requests of stages 136 to 138 to start execution of a relevant stage and has a function that requests execution of a stage after execution are stored as programs on the shared memory 131.

Further, the dependency information table 133 that is a table of dependency information for recording dependency relationships between the stages 136 to 138 and the dependency resolution situation and which controls the program execution sequence, and the ready queue 132 that registers stages that are judged as ready by the dependency resolution processing are stored on the shared memory 131. In this connection a stage is a program of a processing batch.

The cache memories 111 to 115 can be read from or written to only by the respectively corresponding core among the cores 101 to 105, and are memories that have a smaller capacity and higher speed than the shared memory 131. Hereunder, a cache memory may be referred to simply as "cache". When the data at a specified address is "invalid" on the cache memory, an access is made to the shared memory 131 to acquire the data and return it to the core, and when the data is "valid" the data on the cache memory is returned to the core.

Further, each core can instruct "invalidation" of a cache data region (input data region) that is specified from a program, and "writing back" (referred to as "write back") to the shared memory 131 of data that is written in the cache data region (output data region) that is specified from a program. More specifically, with respect to an input data region as a memory region in which input data used by a program is stored, each core can invalidate data from the cache memory using a invalidate command for the specified region, and with respect to an output data region that is a memory region in which output data that is a calculation result of a program is stored, each core can write back data from the cache memory to the shared memory using a write back command for a specified region.

In this connection, with respect to an input data region and an output data region, as described later, data regions (memory regions) on a cache memory corresponding to these input and output data regions that, originally, are formed on a shared memory (see FIG. 22) are similarly referred to as input data regions and output data regions. However, it is not the case that two regions consisting of an input data region and an output data region always exist on the cache memory, and instead an input data region or an output data region is set on the cache memory in accordance with respective operations for data input or output. That is, as viewed from a program, a memory region of a portion corresponding to output (write) from the program is taken as an output data region and a memory region of a portion corresponding to input (read in) to the program is taken as an input data region.

The present embodiment is an apparatus that realizes a H.264 decoder, and has a H.264/AVC syntax parsing stage as a parsing stage and has an intra prediction stage, and inverse transformation stage, a motion compensation stage, a residue addition stage and a deblocking filter (DBF) stage as signal processing stages (see FIG. 5 to FIG. 10).

Figure 11:
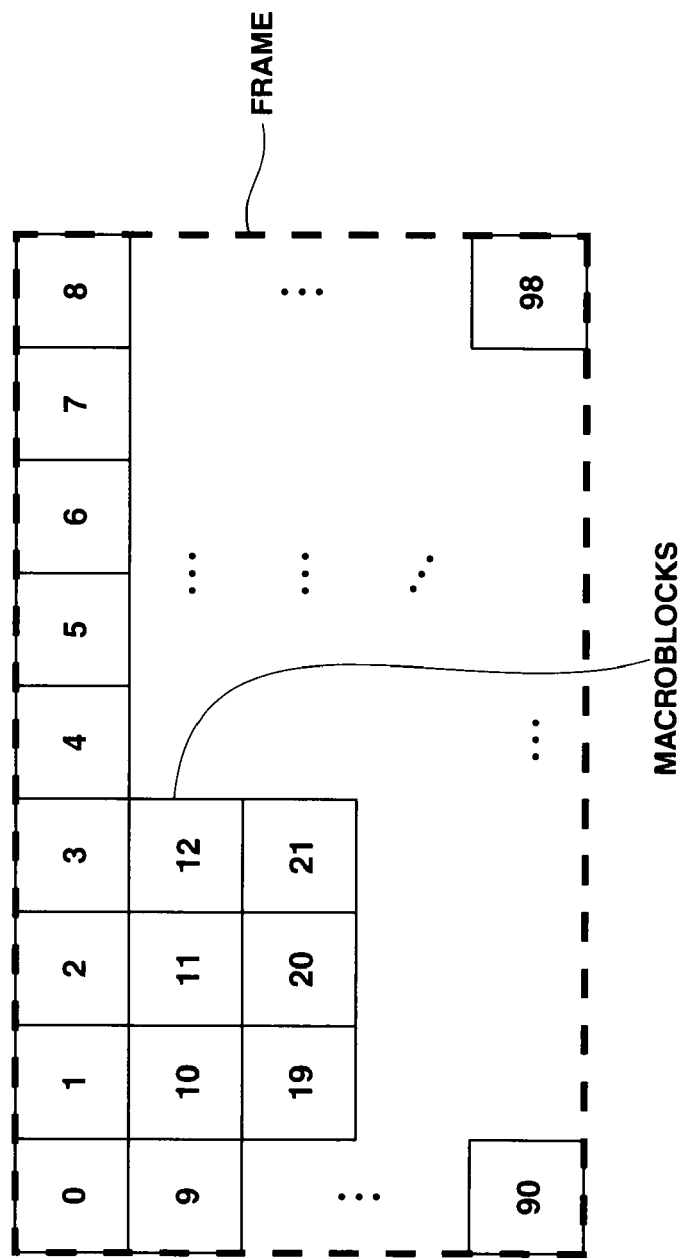
FIG. 11 is a view that illustrates a frame and macroblock addresses.

In H.264 decoding processing, decoding processing is performed based on units referred to as "macroblocks" (MB). Refer to "frame and macroblock address" shown in FIG. 11 with regard to macroblocks. FIG. 11 illustrates a case in which a QCIF size (one frame consists of 9 horizontal×11 vertical macroblocks) is taken as an example. (The 99 numbers from 0 to 98 in FIG. 11 denote macroblock addresses. Hereafter, when a number between 0 and 98 is added following the characters "MB", the number indicates that a macroblock is the macroblock at that address. Accordingly, for example, MB0 and MB11 denote the addresses 0 and 11 shown in FIG. 11, respectively. For each of these macroblocks, use of either intra prediction (hereunder, sometimes represented simply as "I") that uses an intra prediction stage or inter prediction (hereunder, sometimes represented simply as "P") that uses a motion compensation stage is selected depending on parameters specified on the stream to perform decoding processing with respectively different stage configurations. Further, when an operation mode (BS value) for a deblocking filter (DBF) stage is judged as 0 in the parsing stage, there are cases in which the DBF stage is not required.

The parsing stage selects whether to use intra prediction or inter prediction for an encoded image stream as an input, selects whether to use DBF, and outputs a coefficient matrix (Coeff) that is used at an inverse transformation stage, an intra prediction mode in the case of intra prediction, a motion vector in the case of inter prediction, and an operation mode (BS value) of a deblocking filter (DBF) stage (see [parsing processing of stream] in FIG. 5).

The inverse transformation stage receives a Coeff of a macroblock as an input and outputs residual blocks after inverse transformation and inverse quantization (see [signal processing stage of inverse transformation] in FIG. 6).

The motion compensation stage receives a motion vector as an input, and performs motion compensation based on a reference image to output a prediction image (see [signal processing stage of motion compensation] in FIG. 7).

The residue addition stage receives residual blocks and a prediction image as an input, and adds together the pixels of those to output a decoded image (see [signal processing stage of residue addition] in FIG. 8).

Figure 12:
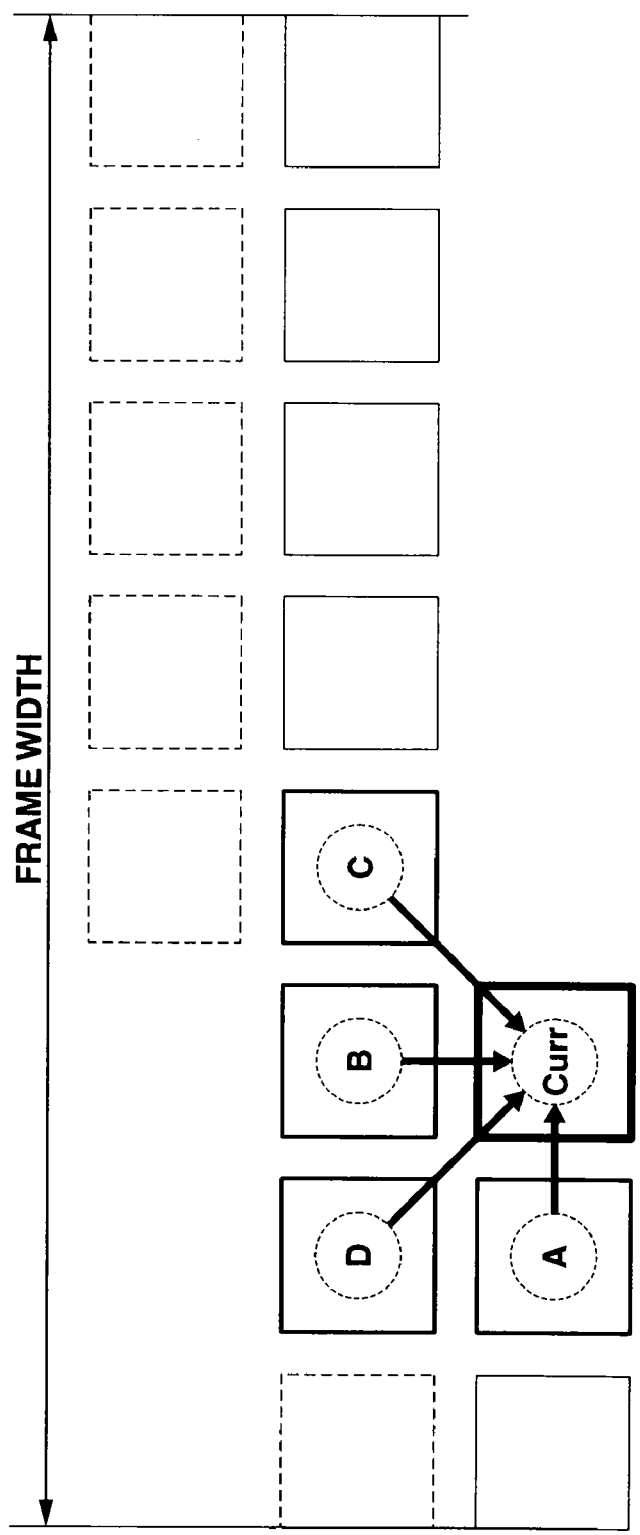
FIG. 12 is a view that illustrates the vicinity of a macroblock.

The intra prediction stage receives an intra prediction mode and decoded images of neighboring macroblocks on the left (direction A), upper (direction B), right upper (direction C), and left upper (direction D) (see [macroblock vicinity reference] in FIG. 12) as an input, and outputs a decoded image of a MB (see [intra prediction signal processing stage] in FIG. 9). In FIG. 12, the reference characters "Curr" denote the current MB. It is not the case that the neighboring macroblocks in all of the directions A, B, C, and D (FIG. 12) are necessarily referred to, and directions that are not referred to can be decided depending on the intra prediction mode and the position of the macroblock.

The deblocking filter stage (DBF stage) receives a decoded image and decoded images to which a deblocking filter (DBF) has already been applied of neighboring macroblocks on the left (direction A) and upper (direction B) as an input, and applies a DBF to the input decoded images to output an image that has undergone a deblocking filter process (see [deblocking filter (DBF) signal processing stage] in FIG. 10).

The dependency information table 133 records the resolution status (indicates whether or not it has become possible to utilize each data that is used by a certain stage S0 (for example, denoted by reference numerals 136)) of dependency relations among the stages 136 to 138. For example, in a format like the [dependency information table] shown in FIG. 4, the dependency information table 133 records whether a stage is valid or invalid, and a resolution status (status in which the stage execution complete information is executed) of dependency relations among stages. The dependency information creation processing and the dependency resolution processing are described later.

Stages in a line in which valid/invalid is set for each stage are indicated as being valid or invalid. A stage will not become a ready stage while invalid is set. When all stages in the line direction shown in FIG. 4 are completed (finished execution), the stages in the line direction are shown as being ready for execution. For example, the intra prediction stage depends on five stages consisting of an inverse transformation stage that outputs residual blocks of the macroblock that is the current coding object and intra prediction stages of peripheral macroblocks (left, top, right top, left top) for creating a prediction image (see FIG. 4). When a given core refers to and updates the dependency information table 133, it acquires a lock for the dependency information table 133 to refer to and update the dependency information table 133 exclusively from all of the other cores. The lock in this case is performed to prevent reading and writing of dependency information by a core other than the core that is referring to and updating the dependency information table 133 (for example, the parsing core 101 and the second signal processing core 103 to the fourth signal processing core 105 are the other cores when dependency resolution processing is being executed by the first signal processing core 102).

The ready queue 132 is a first-in first-out queue that, when all data that is used (depended on) by a certain stage S0 (for example, denoted by reference numeral 136) enters a usable state (dependency is resolved), registers a stage that has become ready. When a certain core adds (execution request) a stage to the queue or fetches (request acceptance) a stage from the queue, it acquires the lock of the ready queue 132 to perform referring and updating exclusively of all other cores. The lock at this time is performed to prevent reading from or writing to the queue by a core other than the core that is performing the adding or fetching of a stage to or from the queue.

Next, the operations of the host task are described.

The host task 134 is a program module that runs on the parsing core 101. FIG. 2 is a view that illustrates a flowchart of the operations of the host task.

Step S1: The host task 134 executes a parsing stage. As a result, an image encoding stream is analyzed and required parameters are extracted.

Step S2: When the parsing stage is completed, a cache data region that stores the data output by the parsing stage is specified to perform write back to the shared memory 131.

Step S3: After acquiring a lock of the dependency information table 133, the host task creates dependency information among the stages (see FIG. 13 that is described later), performs dependency resolution processing relating to whether or not stages are ready and to execution sequence determination (see FIG. 14 that is described later), and releases the lock once more.

Step S4: The host task determines by dependency resolution processing if there is a stage that is ready for execution. When there is no stage that is ready for execution, the operation returns to step S1.

Steps S5 to S7: When there is a stage that is determined to be ready for execution, the host task acquires a lock of the ready queue 132, then registers the stage that is ready for execution in the ready queue 132, notifies the other cores 102 to 105 that a stage has been newly registered, and releases the lock of the ready queue 132.

Thereafter, the host task returns to step S1.

Next, the operations of the PE task will be described.

The PE task 135 is a program module that runs on the signal processing cores. FIG. 3 is a view that illustrates a flowchart of the operations of the PE task.

Steps S11 to S12: After acquiring a lock of the ready queue 132, the PE task checks if a stage is registered in the ready queue 132.

Steps S13 to S14: In a case in which there is a stage registered in the ready queue 132, the PE task fetches the stage from the ready queue 132, releases the lock, and executes step S15.

Steps S23 to S25: When a stage is not registered in the ready queue 132 at step S12, the PE task releases the lock of the ready queue 132, and stands by until a notification is received that another core newly registered a stage. When a notification is received that a stage has been newly registered, the PE task returns to step S11.

Step S15: The PE task "invalidates" the data of a cache data region on which the stage that is fetched from the ready queue 132 depends, and reads the data from the shared memory 131 (when initially accessing that cache data region, the PE task always refers to the data in the shared memory 131). The cache data region at this time is an input data region as viewed from a program on the cache memory.

Step S16: The PE task executes a signal processing stage. There is no necessity to carry out invalidation of cache data and write back of cache data by a program during stage execution.

Step S17: When the stage is completed, the cache data region storing the data output by the stage is specified to perform write back to the shared memory 131. The cache data region at this time is an output data region as viewed from a program on the cache memory.

Step S18: After acquiring a lock of the dependency information table 133, the PE task performs dependency resolution processing (see FIG. 14) and releases the lock once more.

Step S19: The PE task determines by dependency resolution processing if there is a stage that is ready for execution.

Step S20 to S22: When there is a stage that is determined to be ready for execution by the dependency resolution processing, after acquiring the lock of the ready queue 132 the PE task registers (adds) the stage that is ready for execution in the ready queue 132, notifies the other cores that a stage is newly registered, and releases the lock of the ready queue 132.

Thereafter, the PE task returns to step S11.

Next, an example of decoding processing of an I slice of MB0 (MB at the upper left-most position) in an image (see FIG. 11) of QCIF size (size in which one frame consists of 9 horizontal MBs×11 vertical MBs) is described. An I slice is a slice that is encoded by only intra prediction in H.264/AVC.

Even when performing intra prediction, data dependency does not arise between macroblocks since a data dependency does not arise for the macroblock MB0 on the upper left of the screen with respect to the outside of the screen.

Figure 15:
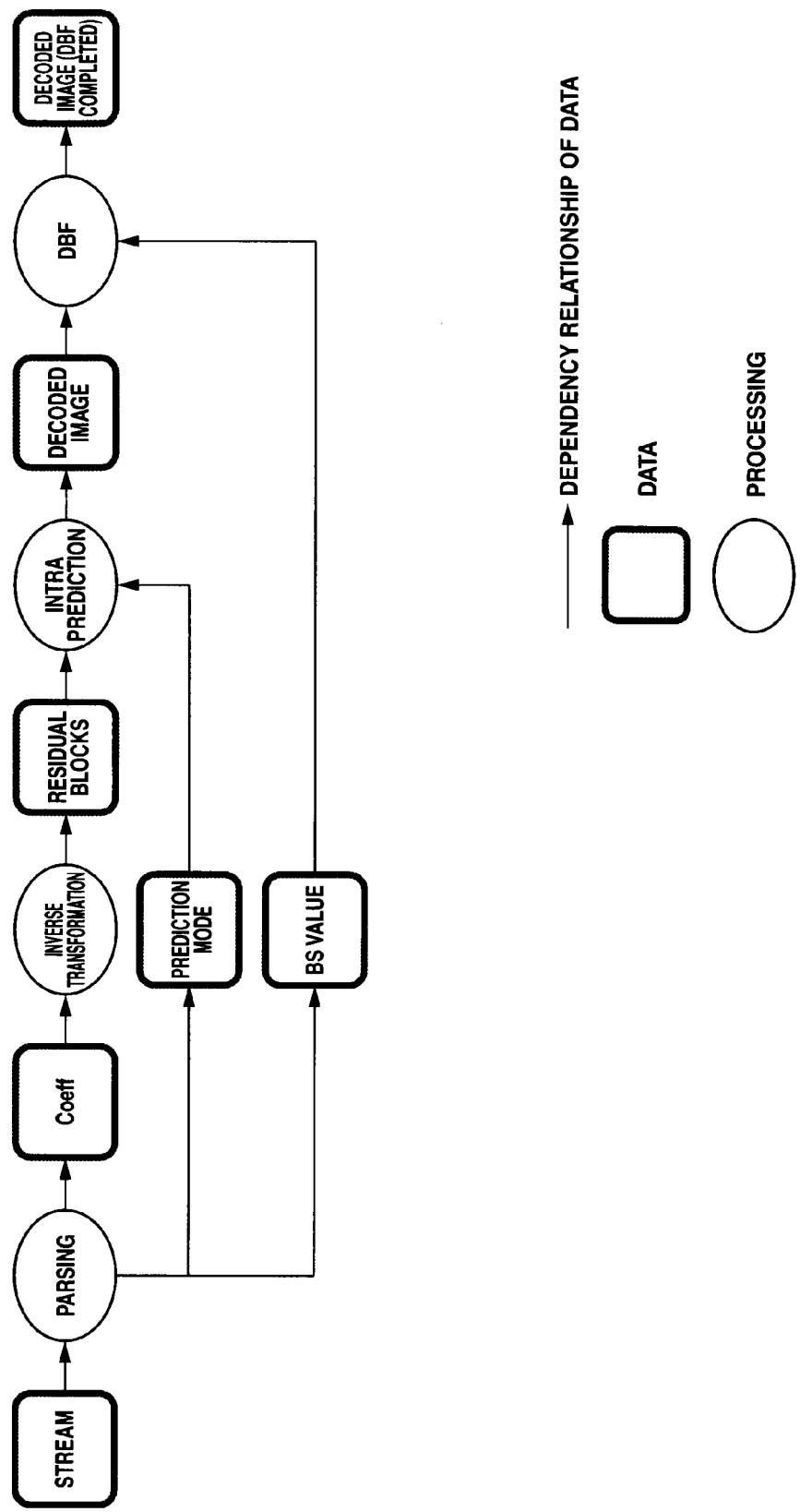
FIG. 15 is a view that illustrates decoding processing of I slice MB0 in a memory management system according to the first embodiment of the present invention.

FIG. 15 is a view that illustrates [decoding processing contents of I slice MB0]. Reference characters MB0 denote the macroblock address 0 in FIG. 11. In FIG. 15, a square indicates data, and a circle indicates a processing stage. The arrows between data and stages indicate the flow of data, and it is shown that there is a data dependency relation in the arrow direction. In this case, the term "dependency relation" refers to one kind of execution sequence relation that is produced by a data definition and usage relation.

The decoding processing is performed by carrying out the following four steps by coordinated operation among each core such that the parsing core performs one step and the signal processing cores perform three steps.

Step 1. An image encoding stream corresponding to MB0 is input, parsing is performed, and a Coeff, a prediction mode, and a BS value of MB0 are output.

Step 2. Inverse transformation is performed taking the Coeff of MB0 as an input, and residual blocks of MB0 are output.

Step 3. Intra prediction is performed taking the residual blocks of MB0 and the prediction mode of MB0 as an input, and a decoded image of MB0 is output.

Step 4. DBF is performed taking the decoded image of MB0 and a BS value of MB0 as an input, and a DBF-completed decoded image is output.

FIG. 16 is a view that illustrates a sequence diagram (I slice MB0 vicinity) of the decoding processing shown in FIG. 15.

In the sequence chart shown in FIG. 16, form the left side, a ready queue lane shown as an "awaiting execution queue" lane indicates with squares which cores are accessing the ready queue 132. A dependency information table lane shown as a "dependency resolver" lane indicates with squares which cores are accessing the dependency information table 133. A "parsing core" lane indicates with squares which kind of processing is being performed with the parsing core. Each lane of the "first to third signal processing cores" indicate which kind of processing is being performed with each of the signal processing cores. In FIG. 16, it is shown that processing proceeds (time passes) in the order from top to bottom in the vertical direction. (The size of a square is not proportional to the time). Accordingly, the left to right direction (horizontal direction) indicates the same time.

In FIG. 16, the parsing core, first signal processing core, first signal processing core, second signal processing core, parsing core ... that are shown in temporal order from top to bottom in the "awaiting execution queue" lane indicate that the respective cores are using the ready queue 132 at those respective times. Similarly, the parsing core, first signal processing core, parsing core, second signal processing core ... that are shown in temporal order from top to bottom in the "dependency resolver" lane indicate that the respective cores are using the dependency information table 133 as a dependency resolver at those respective times.

As an example of processing in which cores do not compete with each other (are not in a dependency relation), for example, the first signal processing core (denoted by reference numeral 102 in FIG. 1) that is shown as the third core from the top in the "awaiting execution queue" lane in FIG. 16 performs MB0 execution request processing of the "first signal processing core" lane. At that time, the parsing core of the "dependency resolver" lane that is shown in the same line (i.e. the same time) performs MB1 dependency resolution processing of the "parsing core" lane.

In the following description, reference numerals (1) to (16) and *1 to *3 correspond to reference numerals (1) to (16) and *1 to *3 that are used in FIG. 16.

The parsing core 101 operates as described below with respect to MB0 in accordance with the procedures shown in "host task operations" shown in FIG. 2.

(1) The parsing core 101 executes a parsing stage for MB0, and outputs slice information (whether the slice is a P slice or an I slice), and the MB0 Coeff, prediction mode, and BS value.

(2) The parsing core 101 performs dependency resolution processing of the parsing stage of MB0. Reading and writing of the dependency information table 133 is performed by directly referring to and updating the shared memory 131 without passing through the cache memory.

(2.1) The parsing core 101 acquires the lock of the dependency information table 133.

(2.2) The parsing core 101 performs dependency information creation processing in accordance with the "dependency information creation processing" procedures shown in FIG. 13. The flowchart illustrating "dependency information creation processing" shown in FIG. 13 will now be described.

Step S31: The parsing core 101 sets whether a stage item is valid or invalid.

Step S32: The parsing core 101 sets dependency origin stage completion information, and ends the processing.

FIG. 17 is a view that illustrates the "initial state of the MB0 dependency information table". FIG. 18 is a view that illustrates the state "after dependency resolution processing of the MB0 dependency information table".

Based on the results of the MB0 parsing stage, the parsing core 101 determines that the slice is an I slice (slice using only intra prediction), and sets inverse transformation to valid, motion compensation to invalid, residue addition to invalid, intra prediction to valid, and DBF to valid in the stage validity field.

Since MB0 is located at the upper left-most position on the screen, "completed" is marked for the left MB, the upper MB, the left upper MB, and the right upper MB of intra prediction and for the left MB and the upper MB of DBF, respectively. "Completed" is also marked in the residue addition stage column of DBF.

(2.3) FIG. 19 is a view that illustrates the state "after dependency resolution processing of parsing of the MB0 dependency information table". "Completed" is marked in the MB0 parsing stage column of the inverse transformation stage of MB0 that is dependent on the output and Coeff of the parsing stage of MB0. Similarly, with respect to the BS value and the prediction mode, "completed" is marked in the corresponding columns of the DBF stage and the intra prediction stage, respectively.

(2.4) The parsing core 101 determines whether or not each stage that is marked with "completed" is ready for execution. Since all the data is arranged for the inverse transformation stage, the parsing core 101 determines that this stage is ready for execution. Since MB0 intra prediction is marked "incomplete" in the DBF stage, and MB0 inverse transformation is "incomplete" in the intra prediction stage, the parsing core 101 determines that these stages are awaiting data.

(2.5) The parsing core 101 releases the lock of the dependency information table 133.

(3) The parsing core 101 performs execution request processing (addition of stage to queue). Reading from and writing to the ready queue 132 is performed by directly referring to and updating the shared memory 131 without passing through the cache.

(3.1) The parsing core 101 acquires the lock of the ready queue 132.

(3.2) The parsing core 101 registers the MB0 inverse transformation stage that is determined to be ready for execution in the ready queue 132.

(3.3) After registration to the ready queue 132 is completed, the parsing core 101 notifies the other cores that a new request is added. (Confirmation that a notification is received is not carried out.) (*1) (See FIG. 16).

(3.4) The parsing core 101 releases the lock of the ready queue 132.

When the parsing core 101 completes execution of the processing to this point, the parsing core 101 starts executing the parsing stage for MB1 in accordance with the procedures shown in "host task operations" shown in FIG. 2.

The first signal processing core (denoted by reference numeral 102 in FIG. 1) that is operating in parallel with the parsing core 101 operates in the following manner in accordance with the procedures shown in "PE task operations" shown in FIG. 3.

(4) The first signal processing core performs request acceptance processing (fetching of a stage from the queue). Reading from and writing to the ready queue 132 is performed by directly referring to and updating the shared memory 131 without passing through the cache.

(4.1) The first signal processing core acquires the lock of the ready queue 132.

(4.2) The first signal processing core confirms whether there is a stage ready for execution registered in the ready queue 132. In this case, no stage has been registered yet.

(4.3) The first signal processing core releases the lock of the ready queue 132.

(4.4) The first signal processing core waits until a notification is received from another core to the effect that a stage has been newly registered in the ready queue 132.

(4.5) Upon receiving a notification of a new stage registration from the parsing core 101 (*1), the first signal processing core returns from the waiting state.

(5) The first signal processing core performs request acceptance processing once more. Reading from and writing to the ready queue 132 is performed by directly referring to and updating the shared memory 131 without passing through the cache.

(5.1) The first signal processing core acquires the lock of the ready queue 132.

(5.2) The first signal processing core confirms whether there is a stage ready for execution registered in the ready queue 132. In this case, the MB0 inverse transformation stage is registered in the ready queue 132.

(5.3) The first signal processing core fetches the MB0 inverse transformation stage from the ready queue 132.

(5.4) The first signal processing core releases the lock of the ready queue 132.

(6) The first signal processing core performs execution processing of the MB0 inverse transformation stage.

(6.1) The first signal processing core checks the dependency information table 133 of the MB0 inverse transformation stage (at this time, the lock of the dependency information table 133 is not necessary), and "invalidates" the cache contents for the Coeff data region that is marked with "completed".

(6.2) The first signal processing core executes processing of the MB0 inverse transformation stage taking Coeff as an input, and outputs residual blocks. During execution of the signal processing stage, the data region is referred to entirely via the cache, without performing reading or writing of the shared memory 131 directly, explicit invalidate and write back of the cache.

(6.3) The first signal processing core "writes back" the contents of the residual blocks in the cache to the shared memory 131.

Figure 14:
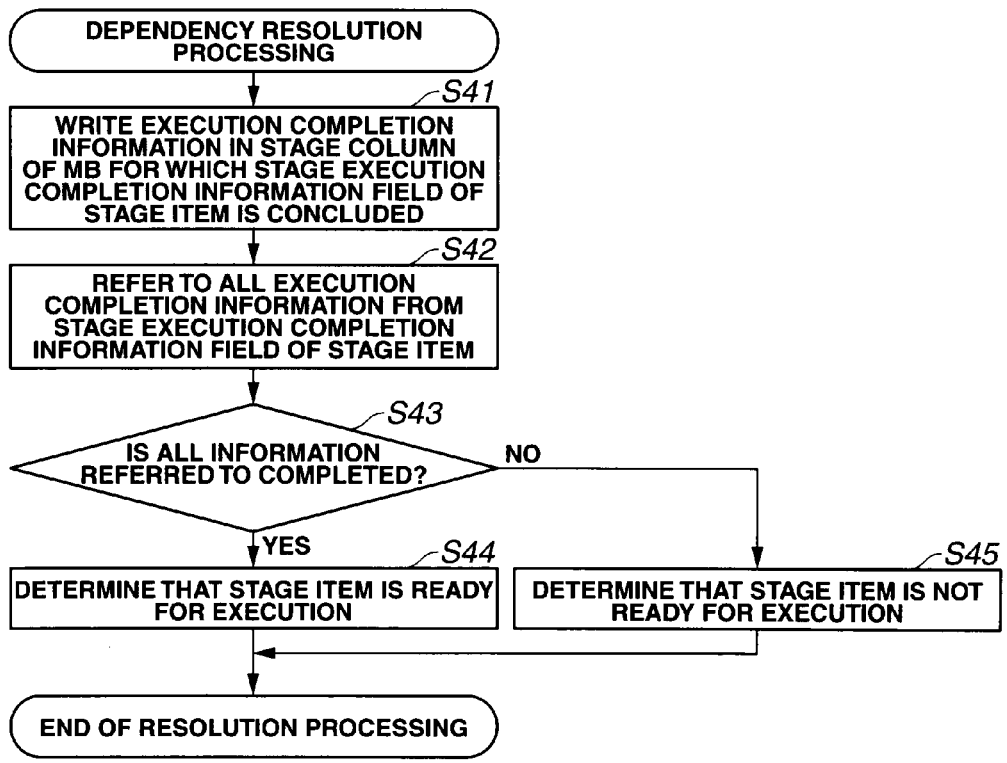
FIG. 14 is a flowchart of dependent resolution processing.

(7) The first signal processing core performs dependency resolution processing of the inverse transformation stage of MB0 in accordance with the "dependency resolution processing" procedures shown in FIG. 14. Input and output are stage items that take a macroblock (MB) as an object. Output represents a determination result with respect to whether a stage item is ready or not ready.

The flowchart illustrating the "dependency resolution processing" shown in FIG. 14 will now be described.

Step S41: The first signal processing core writes execution completion information in the stage column of an MB for which the stage execution complete information field of the stage item is concluded.

Step S42: The first signal processing core refers to all the execution complete information from the stage execution complete information field of the stage item.

Step S43: The first signal processing core determines whether or not all of the information referred to is already completed.

Step S44: When the result at S43 is "Yes", the first signal processing core determines that the stage item is ready for execution, and ends the processing.

Step S45: When the result at S43 is "No", the first signal processing core determines that the stage item is not ready for execution, and ends the processing.

Reading and writing of the dependency information table 133 is performed by directly referring to and updating the shared memory 131 without passing through the cache.

(7.1) The first signal processing core acquires the lock of the dependency information table 133.

(7.2) FIG. 20 illustrates the state "after dependency resolution processing of inverse transformation of the MB0 dependency information table". "Completed" is marked in the field for the MB0 inverse transformation stage of the intra prediction stage that depends on residual blocks that are the output of the inverse transformation stage of MB0.

(7.4) The first signal processing core determines whether or not each stage that is marked with "completed" is ready for execution. Since all the data is arranged for the intra prediction stage, the first signal processing core determines that this stage is ready for execution.

(7.5) The first signal processing core releases the lock of the dependency information table 133.

(8) The first signal processing core performs execution request processing.

(8.1) The first signal processing core acquires the lock of the ready queue 132.

(8.2) The first signal processing core registers the MB0 intra prediction stage that is determined to be ready for execution in the ready queue 132.

(8.3) After registration to the ready queue 132 is completed, the first signal processing core notifies the other cores that a new request is added. (Confirmation that a notification is received is not carried out.) (*2) (See FIG. 16).

(8.4) The first signal processing core releases the lock of the ready queue 132.

The second signal processing core that operates in parallel with the parsing core 101 and the first signal processing core operates in the following manner in accordance with the procedures shown in "PE task operations" in FIG. 3.

(9) The second signal processing core performs request acceptance processing. Reading from and writing to the ready queue 132 is performed by directly referring to and updating the shared memory 131 without passing through the cache.

(9.1) The second signal processing core acquires the lock of the ready queue 132.

(9.2) The second signal processing core confirms whether there is a stage ready for execution registered in the ready queue 132. In this case, no stage has been registered yet.

(9.3) The second signal processing core releases the lock of the ready queue 132.

(9.4) The second signal processing core waits until a notification is received from another core to the effect that a stage has been newly registered in the ready queue 132.

(9.5) Upon receiving a notification of a new stage registration from the parsing core 101 (*1), the second signal processing core returns from the waiting state.

(9.6) The second signal processing core acquires the lock of the ready queue 132.

(9.7) The second signal processing core confirms whether there is a stage ready for execution registered in the ready queue 132. Since the first signal processing core has already fetched a stage, there is no registered stage.

(9.8) The second signal processing core releases the lock of the ready queue 132.

(9.9) The second signal processing core waits until a notification is received from another core to the effect that a stage has been newly registered in the ready queue 132.

(9.10) Upon receiving a notification of a new stage registration from the first signal processing core (*2), the second signal processing core returns from the waiting state.

(10) The second signal processing core performs request acceptance processing once more. Reading from and writing to the ready queue 132 is performed by directly referring to and updating the shared memory 131 without passing through the cache.

(10.1) The second signal processing core acquires the lock of the ready queue 132.

(10.2) The second signal processing core confirms whether there is a stage ready for execution registered in the ready queue 132. In this case, the MB0 intra prediction stage is registered in the ready queue 132.

(10.3) The second signal processing core fetches the MB0 intra prediction stage from the ready queue 132.

(10.4) The second signal processing core releases the lock of the ready queue 132.

(11) The second signal processing core performs execution processing of the MB0 intra prediction stage.

(11.1) The second signal processing core checks the dependency information table 133 of the MB0 intra prediction stage (at this time, the lock of the dependency information table 133 is not necessary), and "invalidates" the cache contents of the data region of the residual blocks and the data region of the prediction mode that are marked with "completed".

(11.2) The second signal processing core executes processing of the MB0 intra prediction stage taking the prediction mode and the residual blocks as an input, and outputs a decoded image. During execution of the signal processing stage, the data region is referred to entirely via the cache, without performing reading or writing of the shared memory 131 directly, explicit invalidate and write back of the cache.

(11.3) The second signal processing core "writes back" the contents of the decoded image in the cache to the shared memory 131.

(12) The second signal processing core performs dependency resolution processing of the MB0 intra prediction stage according to the "dependency resolution processing" procedures shown in FIG. 14. Reading and writing of the dependency information table 133 is performed by directly referring to and updating the shared memory 131 without passing through the cache.

(12.1) The second signal processing core acquires the lock of the dependency information table 133.

(12.2) FIG. 21 illustrates the state "after dependency resolution processing of intra prediction of the MB0 dependency information table". "Completed" is marked in the field for the MB13 intra prediction stage of the intra prediction stage of MB12 (right lower MB), the intra prediction stage of MB11 (bottom side MB), the intra prediction stage of MB1 (right side MB), and the DBF stage that depend on a decoded image that is the output of the MB0 intra prediction stage.

(12.3) The second signal processing core determines whether or not each stage that is marked with "completed" is ready for execution. Since all the data is arranged for the MB0 DBF stage, the second signal processing core determines that the stage is ready for execution. Because some data has not yet been generated for the MB1 intra prediction stage, the MB11 intra prediction stage, and the MB12 intra prediction stage, the second signal processing core determines that those stages are awaiting data.

(12.4) The second signal processing core releases the lock of the dependency information table 133.

(13) The second signal processing core performs execution request processing. Reading from and writing to the ready queue 132 is performed by directly referring to and updating the shared memory 131 without passing through the cache.

(13.1) The second signal processing core acquires the lock of the ready queue 132.

(13.2) The second signal processing core registers the MB0 DBF stage that is judged to be ready for execution in the ready queue 132.

(13.3) After registering to the ready queue 132 is completed, the second signal processing core notifies the other cores that a new request is added. (Confirmation that a notification is received is not performed.) (*3) (See FIG. 16).

(13.4) The second signal processing core releases the lock of the ready queue 132.

After completion of (8), the first signal processing core that operates in parallel with the parsing core 101 and the second signal processing core (denoted by reference numeral 103 in FIG. 1) is in a state in which it is waiting for a notification from the request acceptance processing.

(14) Upon receiving the notification at *3 of the second signal processing core, the first signal processing core returns from the waiting state and performs request acceptance processing.

Reading from and writing to the ready queue 132 is performed by directly referring to and updating the shared memory 131 without passing through the cache.

(14.1) The first signal processing core acquires the lock of the ready queue 132.

(14.2) The first signal processing core confirms whether there is a stage ready for execution registered in the ready queue 132. In this case, the MB0 DBF stage is registered in the ready queue 132.

(14.3) The first signal processing core fetches the MB0 DBF stage from the ready queue 132.

(14.4) The first signal processing core releases the lock of the ready queue 132.

(15) The first signal processing core performs execution processing of the MB0 DBF stage.

(15.1) The first signal processing core checks the dependency information table 133 of the MB0 DBF stage (at this time, the lock of the dependency information table 133 is not required) and "invalidates" the cache contents for a data region of the BS value and a data region of the decoded image that are marked with "completed"

(15.2) The first signal processing core executes processing of the MB0 DBF stage by taking the BS value and the decoded image as an input, and outputs a DBF-completed decoded image. During execution of the signal processing stage, the data region is referred to entirely via the cache without performing reading or writing of the shared memory 131 directly, explicit invalidate and write back of the cache.

(15.3) The first signal processing core "writes back" the contents of the data region of the DBF-completed decoded image that is in the cache to the shared memory 131.

(16) The first signal processing core performs dependency resolution processing of the MB0 DBF stage in accordance with the procedures in "dependency resolution processing" shown in FIG. 14. Reading from and writing to the dependency information table 133 is performed by directly referring to and updating the shared memory 131 without passing through the cache.

(16.1) The first signal processing core acquires the lock of the dependency information table 133.

(16.2) The first signal processing core marks "completed" in the field of the DBF stage of MB1 (MB on right side) and the dependency information table 133 MB0 DBF stage of the DBF stage of MB11 (MB on bottom side) that depend on a DBF-completed decoded image that is the output of the MB0 DBF stage.

(16.3) The first signal processing core determines whether or not each stage that is marked with "completed" is ready for execution. Because some data has not yet been generated for both the MB1 DBF stage and the MB11 DBF stage, the first signal processing core determines that those stages are awaiting data.

(16.4) The first signal processing core releases the lock of the dependency information table 133.

According to the steps of the above described first embodiment, decoding processing of one macroblock can be completed in a case using intra prediction and in which there is no data dependency between macroblocks.

According to the above described first embodiment, it is possible to maintain the coherency of a cache by limiting insertion of an instruction to write back and invalidate a cache data region to only immediately before execution and immediately after execution of a program as a processing batch and keeping insertion of a cache operation instruction from a program to a minimum.

In this connection, the above described first embodiment of the present invention is not limited to the cache operation instructions insertion limitation described above, and a region of an invalidation target and a write back target of the cache memory may also be specified by deciding an insertion location of a cache operation instruction using the following kinds of means (1) and (2).

For example, (1) an input data region and an output data region of a processing batch in a cache memory may be determined based on the input/output relationship of a dependency information table that controls an execution sequence of a program.

Figure 22:
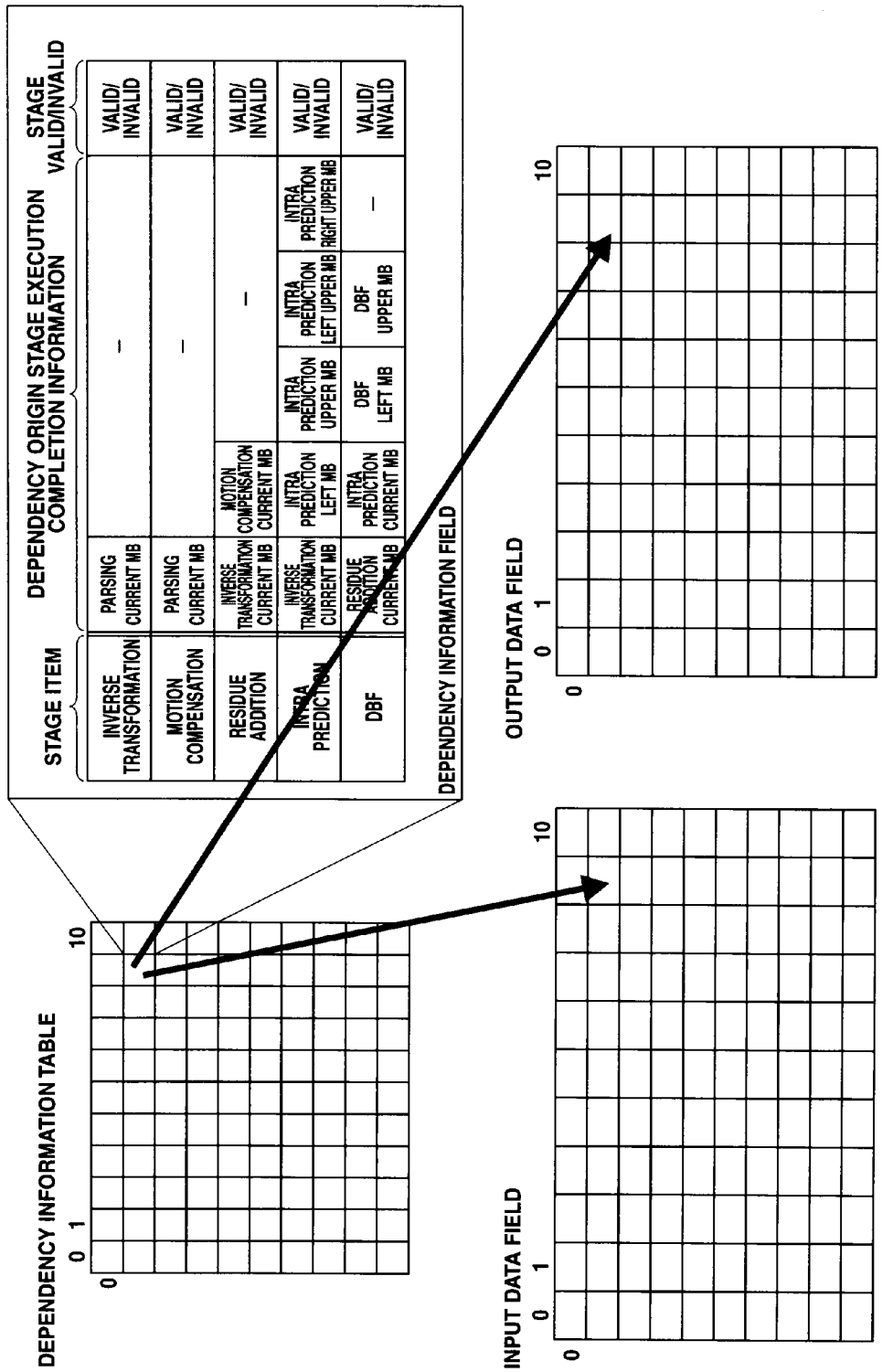
FIG. 22 is a view that illustrates the relationship between a dependency information table and an input data region and output data region in a cache memory.

1) An input data region "in" and an output data region "out" of a processing batch in a cache memory are reserved so as to correspond with the sequence of a dependency information table that controls the execution order of a program. As shown in FIG. 22, in the input data region and the output data region, input and output data are arranged in the same sequence as the macroblocks of the dependency information table.

2) When resolving a dependency relation with the dependency information table, if a position determined at that time is taken as an index, the position of an input data region that is made an operation target of the cache memory can be determined by:

in+index*(size of input data), and the position of an output data region can be determined by:

out+index*(size of output data).

Wherein, the symbol * means multiplication.

(2) The input data region and output data region of a processing batch in the cache memory may also be determined from the input/output relationship of data of a program to be a processing batch based on the contents of header information of a dynamic image encoding stream.

For example, taking the example of a sequence parameter set, a picture parameter set, and a slice header that are header information of a dynamic image encoding stream for ITU H.264, it is possible to determine whether or not to use a program for deblocking filter processing as a processing batch based on these headers. Based on the header information of this stream, a memory region as an operation target of the cache memory is switched. FIGS. 23A and 23B illustrate a case in which DBF is valid in FIG. 23A and DBF is invalid in FIG. 23B. When DBF is invalid, after residue addition processing, a decoded image (DBF completed) is output directly.

Further, (3) in a case in which a processing result of a program that is a preceding processing batch is utilized by a program that is a succeeding processing batch when two programs as processing batches are executed in succession on the same processor, a configuration may be adopted in which invalidation of data of an input data region of the cache memory is omitted.

Figure 24A:
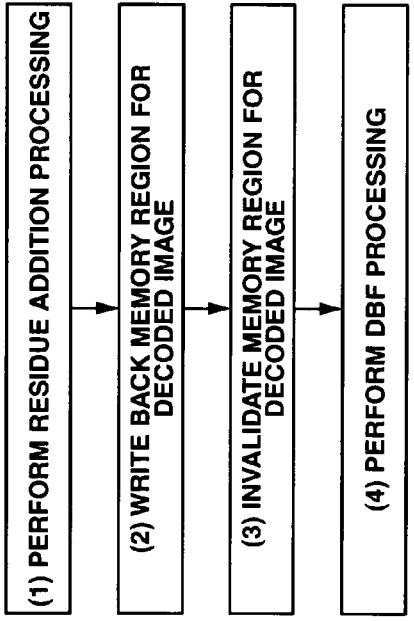
FIGS. 24A and 24B are views that illustrate operation examples in a case where operations for programs that are two processing batches are performed in succession on different processors, in which the processing result of the program that is the preceding processing batch is utilized by the program that is the following processing batch.
Figure 24B:
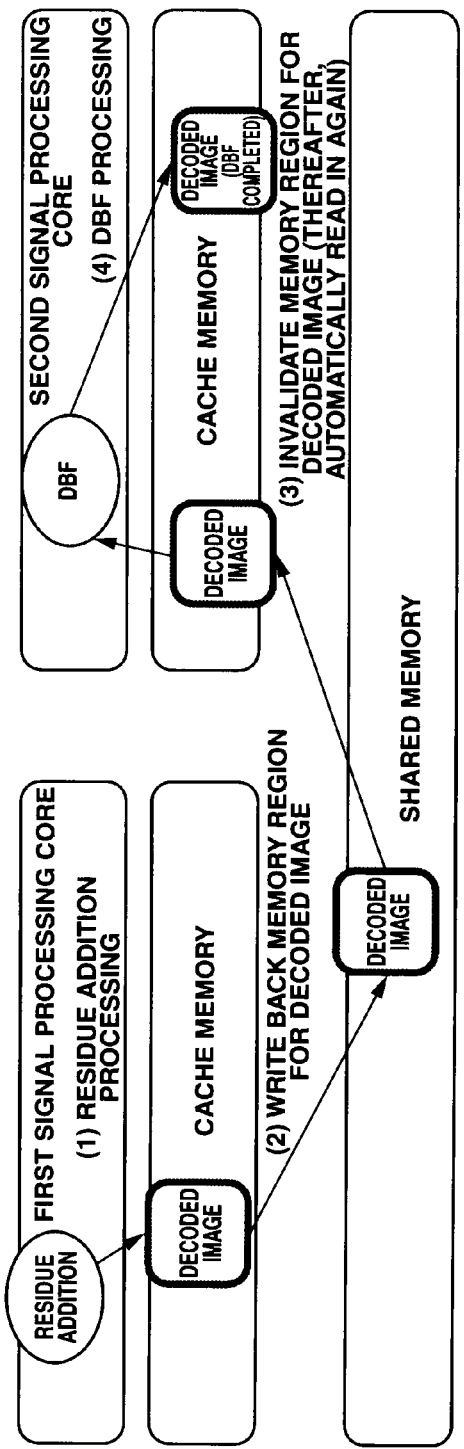
Figure 25A:
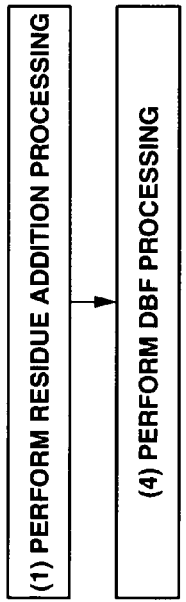
FIGS. 25A and 25B are views that illustrate operation examples in a case where operations for programs that are two processing batches are performed in succession on the same processor, in which the processing result of the program that is the preceding processing batch is utilized by the program that is the following processing batch.
Figure 25B:
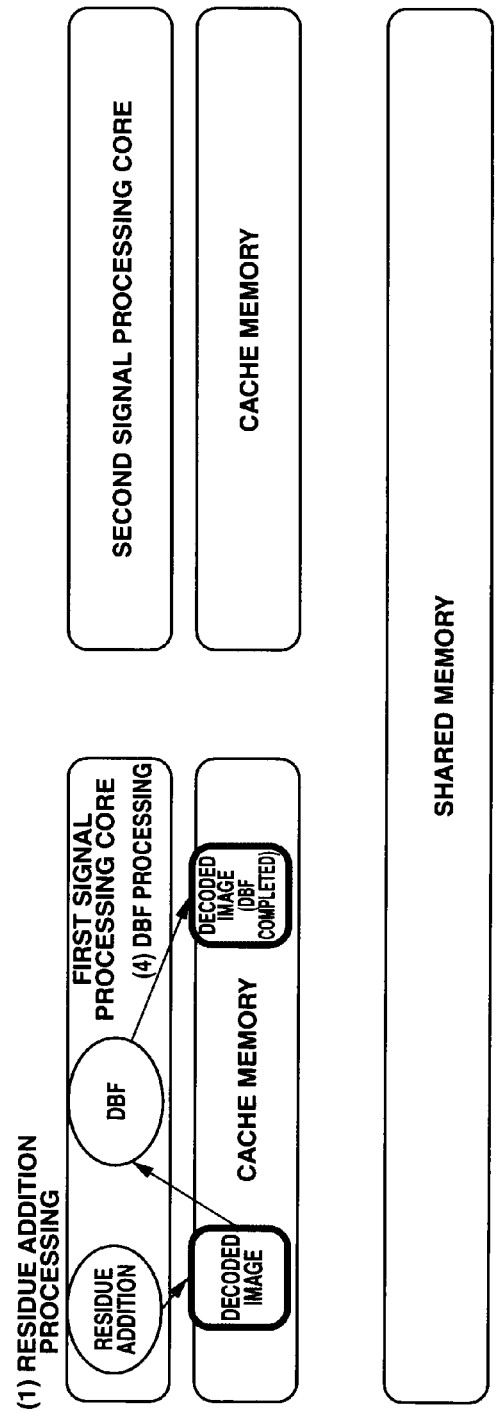

In a case in which a processing result of one program is utilized by a program that is a succeeding processing batch on different processors, as shown in FIGS. 24A and 24B, after performing write back to a shared memory one time, the program that is a succeeding processing batch must invalidate the relevant input data region and read the updated data again from the shared memory. This re-reading of data is automatically executed after invalidation of the input data region. In this connection, FIG. 24A is a view that illustrates a flowchart of operations on the different processors and FIG. 24B is a view that illustrates operations on the different processors. The numbers in parentheses 1 to 4 shown in FIGS. 24A and 24B represent the operation sequence. In contrast, when it is established that a program that is a succeeding processing batch can be executed on the same processor based on a dependency information table or the like, as shown in FIGS. 25A and 25B, write back and invalidation processing with respect to the cache memory may be omitted. In this connection, FIG. 25A is a view that illustrates a flowchart of operations on the same processor and FIG. 25B is a view that illustrates operations on the same processor. In FIGS. 25A and 25B, the operations are only those of numbers in parentheses 1 and 4 among the numbers in parentheses 1 to 4 representing the operation sequence as shown in FIGS. 24A and 24B.

According to the first embodiment described above, in a system having a plurality of processors and a shared memory that can be accessed from each of the plurality of processors in which each processor has a cache memory with respect to which write back and invalidation of a specified region can be instructed from a program, it is possible to maintain the coherency of a cache by limiting insertion of an instruction to write back and invalidate a cache data region to only immediately before execution and immediately after execution of a program as a processing batch and keeping insertion of a cache operation instruction from a program to a minimum.

Further, by automatically determining an insertion location of a cache operation instruction based on the contents of data dependency information or header information such as that of a dynamic image encoding stream, a region that is an invalidation target or write back target of a cache can be specified.

Furthermore, it is possible to eliminate wasteful operations to invalidate/write back a cache when performing processing on the same processor.

As a result, for a multiprocessor system having a plurality of processors, a cache memory, and a shared memory, it is possible to realize a memory management system in which the coherence of the cache memory and the shared memory is efficiently managed when performing image processing without increasing the scale of hardware such as, for example, a cache management apparatus.

Second Embodiment

According to the second embodiment of the present invention a case is described in which there is data dependency between macroblocks for which intra prediction is used.

FIG. 26 is a view that illustrates "decoding processing contents of I slice MB11" in a memory management system of the second embodiment of the present invention. MB11 represents the macroblock address 11 shown in FIG. 11.

The decoding processing for MB11 that is illustrated in the lower part of FIG. 26 is performed by carrying out the following four steps by coordinated operation between the single parsing core and three signal processing cores.

Step 1. An image encoding stream corresponding to MB11 is input, parsing is performed, and a Coeff, a prediction mode, and a BS value of MB11 are output.

Step 2. Inverse transformation is performed taking the Coeff of MB11 as an input, and residual blocks of MB11 are output.

Step 3. Intra prediction is performed by taking as an input the residual blocks of MB11, the prediction mode of MB11, a decoded image of MB10 illustrated in the center part of FIG. 26, a decoded image of MB2 illustrated in the upper part of FIG. 26, a decoded image of MB1, and a decoded image of MB3, and as a result a decoded image of MB11 is output.

Step 4. DBF is performed by taking as an input the decoded image of MB11, a DBF-completed decoded image of MB10 that is illustrated in the center part of FIG. 26, a DBF-completed decoded image of MB2 that is illustrated in the upper part of FIG. 26, and a BS value, as a result a DBF-completed decoded image is output.

Figure 27:
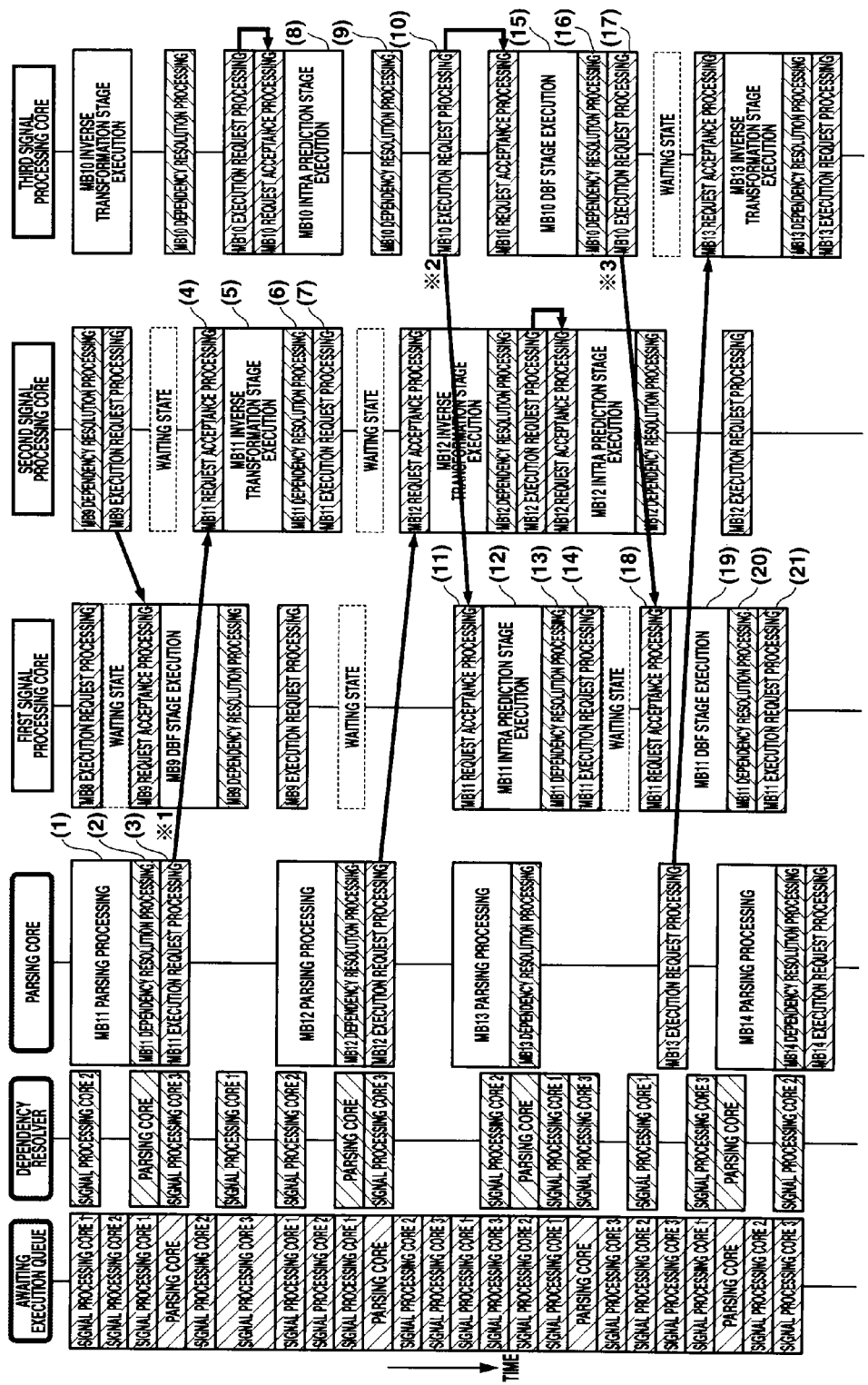
FIG. 27 is a view that illustrates a sequence (I slice MB11 vicinity) in the decoding processing contents shown in FIG. 26.

FIG. 27 is a view that illustrates a sequence diagram (I slice MB11 vicinity) of the decoding processing contents shown in FIG. 26.

The parsing core 101 operates as described below with respect to MB11 in accordance with the procedures described in "host task operations" shown in FIG. 2.

In the following description, reference numerals (1) to (20) and *1 to *3 correspond to reference numerals (1) to (20) and *1 to *3 that are used in FIG. 27.

(1) The parsing core 101 executes the parsing stage of MB11, and outputs slice information (whether the slice is a P slice or an I slice), and the MB11 Coeff, prediction mode, and BS value.

(2) The parsing core 101 performs dependency resolution processing of the parsing stage of MB11. Reading and writing of the dependency information table 133 is performed by referring to and updating the shared memory 131 directly without passing through the cache memory.

(2.1) The parsing core 101 acquires the lock of the dependency information table 133.

(2.2) FIG. 28 shows a state "before dependency information creation of the MB11 dependency information table". FIG. 29 shows a state "after dependency information creation of the MB11 dependency information table". The parsing core 101 performs dependency information creation processing in accordance with the "dependency information creation processing" procedures shown in FIG. 13. Based on the results of the MB11 parsing stage, the parsing core 101 determines that the slice is an I slice (slice using only intra prediction), and sets inverse transformation to valid, motion compensation to invalid, residue addition to invalid, intra prediction to valid, and DBF to valid in the stage validity field.

(2.3) FIG. 30 is a view that illustrates the state "after dependency resolution processing of parsing of the MB11 dependency information table". "Completed" is marked in the parsing stage column of MB11 for the inverse transformation stage of MB11 that is dependent on the output and Coeff of the parsing stage of MB11. Similarly, with respect to the BS value and the prediction mode, "completed" is marked in the corresponding columns for the DBF stage and the intra prediction stage, respectively.

(2.4) The parsing core 101 determines whether or not each stage for which "completed" is marked is ready for execution. Since all the data is arranged for the inverse transformation stage, the parsing core 101 determines that this stage is ready for execution. Since MB11 intra prediction is marked "incomplete" in the DBF stage, and MB11 inverse transformation is "incomplete" in the intra prediction stage, the parsing core 101 determines that these stages are awaiting data.

(2.5) The parsing core 101 releases the lock of the dependency information table 133.

(3) The parsing core 101 performs execution request processing (addition of stage to queue). Reading from and writing to the ready queue 132 is performed by directly referring to and updating the shared memory 131 without passing through the cache.

(3.1) The parsing core 101 acquires the lock of the ready queue 132.

(3.2) The parsing core 101 registers the MB11 inverse transformation stage that is judged as ready for execution in the ready queue 132.

(3.3) After registration to the ready queue 132 is completed, the parsing core 101 notifies other cores that a new request is added. (Confirmation that a notification is received is not carried out.) (*1) (See FIG. 27).

(3.4) The parsing core 101 releases the lock of the ready queue 132.

When the parsing core 101 completes execution of the processing to this point, the parsing core 101 starts executing the parsing stage for MB12 in accordance with the procedures described in "host task operations" shown in FIG. 2.

The second signal processing core that is operating in parallel with the parsing core 101 operates in the following manner in accordance with the procedures described in "PE task operations" shown in FIG. 3.

(4) The second signal processing core performs request acceptance processing (fetching of a stage from the queue). Reading from and writing to the ready queue 132 is performed by directly referring to and updating the shared memory 131 without passing through the cache.

(4.1) The second signal processing core acquires the lock of the ready queue 132.

(4.2) The second signal processing core confirms whether there is a stage ready for execution registered in the ready queue 132. In this case, no stage has been registered yet.

(4.3) The second signal processing core releases the lock of the ready queue 132.

(4.4) The second signal processing core waits until a notification is received from another core to the effect that a stage has been newly registered in the ready queue 132.

(4.5) Upon receiving a notification of a new stage registration from the parsing core 101 (*1), the second signal processing core returns from the waiting state.

(4.6) The second signal processing core acquires the lock of the ready queue 132.

(4.7) The second signal processing core confirms whether there is a stage ready for execution registered in the ready queue 132. In this case, the MB11 inverse transformation stage is registered in the ready queue 132.

(4.8) The second signal processing core fetches the MB11 inverse transformation stage from the ready queue 132.

(4.9) The second signal processing core releases the lock of the ready queue 132.

(5) The second signal processing core performs execution processing of the MB11 inverse transformation stage.

(5.1) The second signal processing core checks the dependency information table 133 of the MB11 inverse transformation stage (at this time, the lock of the dependency information table 133 is not necessary), and "invalidates" the cache contents for the Coeff data region that is marked with "completed".

(5.2) The second signal processing core executes processing of the MB11 inverse transformation stage taking Coeff as an input, and outputs residual blocks. During execution of the signal processing stage, the data region is referred to entirely via the cache, without performing reading or writing of the shared memory 131 directly, explicit invalidate and write back of the cache.

(5.3) The second signal processing core "writes back" the contents of the residual blocks in the cache to the shared memory 131.

(6) The second signal processing core performs dependency resolution processing of the inverse transformation stage of MB11 in accordance with the "dependency resolution processing" procedures shown in FIG. 14. Reading and writing of the dependency information table 133 is performed by referring to and updating the shared memory 131 directly without passing through the cache.

(6.1) The second signal processing core acquires the lock of the dependency information table 133.

(6.2) FIG. 31 illustrates the state "after dependency resolution processing of inverse transformation of the MB11 dependency information table". "Completed" is marked in the field for the MB11 inverse transformation stage of the MB11 intra prediction stage that depends on residual blocks that are the output of the inverse transformation stage of MB11.

(6.3) The second signal processing core determines whether or not each stage that is marked with "completed" is ready for execution. Since the MB10 intra prediction stage is incomplete, the second signal processing core determines that the MB11 intra prediction stage is awaiting data.

(6.4) The second signal processing core releases the lock of the dependency information table 133.

(7) Since there is no execution request that should be processed, the second signal processing core skips execution request processing. The third signal processing core that operates in parallel with the parsing core 101 and the second signal processing core operates in the following manner in accordance with the procedures described in "PE task operations" shown in FIG. 3.

(8) The third signal processing core performs execution processing of the MB10 intra prediction stage.

(8.1) The third signal processing core checks the dependency information table 133 of the MB10 intra prediction stage (at this time, the lock of the dependency information table 133 is not necessary), and "invalidates" the cache contents for the data region of the residual blocks and the data region of the prediction mode that are marked with "completed".

(8.2) The third signal processing core executes processing of the MB10 intra prediction stage taking the prediction mode and the residual blocks as an input, and outputs a decoded image. During execution of the signal processing stage, the data region is referred to entirely via the cache without performing reading or writing of the shared memory 131 directly, explicit invalidate and write back of the cache.

(8.3) The third signal processing core "writes back" the contents of the decoded image in the cache to the shared memory 131.

(9) The third signal processing core (denoted by reference numeral 104 in FIG. 1) performs dependency resolution processing of the MB10 intra prediction stage according to the "dependency resolution processing" procedures shown in FIG. 14. Reading and writing of the dependency information table 133 is performed by directly referring to and updating the shared memory 131 without passing through the cache.

(9.1) The third signal processing core acquires the lock of the dependency information table 133.

(9.2) FIG. 32 illustrates the state "after dependency resolution processing of intra prediction of the MB11 dependency information table". "Completed" is marked in the MB10 intra prediction stage field of the MB20 intra prediction stage, the MB19 intra prediction stage, the MB11 intra prediction stage, and the MB10 DBF stage that depend on a decoded image that is the output of the MB10 intra prediction stage.

(9.3) The third signal processing core determines whether or not each stage that is marked with "completed" is ready for execution. Since all the data is arranged for the MB10 DBF stage and the MB11 intra prediction stage, the third signal processing core determines that these stages are ready for execution. Because some data has not yet been generated for the MB18 intra prediction stage and the MB19 intra prediction stage, the third signal processing core determines that those stages are awaiting data.

(9.4) The third signal processing core releases the lock of the dependency information table 133.

(10) The third signal processing core performs execution request processing (addition of a stage to the queue). Reading from and writing to the ready queue 132 is performed by directly referring to and updating the shared memory 131 without passing through the cache.

(10.1) The third signal processing core acquires the lock of the ready queue 132.

(10.2) The third signal processing core registers the MB11 intra prediction stage that is judged to be ready for execution in the ready queue 132.

(10.3) After registering to the ready queue 132 is completed, the third signal processing core notifies the other cores that a new request is added. (Confirmation that a notification is received is not performed.) (*2) (See FIG. 27).

(10.4) The third signal processing core releases the lock of the ready queue 132.

The first signal processing core that operates in parallel with the parsing core 101, the second signal processing core, and the third signal processing core operates in the following manner in accordance with the procedures described in "PE task operations" shown in FIG. 3.

(11) The first signal processing core performs request acceptance processing (fetching of a stage from the queue). Reading from and writing to the ready queue 132 is performed by directly referring to and updating the shared memory 131 without passing through the cache.

(11.1) Upon receiving a notification to the effect that a stage is newly registered from the third signal processing core (*2), the first signal processing core returns from a waiting state.

(11.2) The first signal processing core acquires the lock of the ready queue 132.

(11.3) The first signal processing core confirms whether there is a stage ready for execution registered in the ready queue 132. In this case, the MB11 intra prediction stage is registered in the ready queue 132.

(11.4) The first signal processing core fetches the MB11 intra prediction stage from the ready queue 132.

(11.5) The first signal processing core releases the lock of the ready queue 132.

(12) The first signal processing core performs execution processing of the MB11 intra prediction stage.

(12.1) The first signal processing core checks the dependency information table 133 of the MB11 intra prediction stage (at this time, the lock of the dependency information table 133 is not necessary), and "invalidates" the cache contents for the data region of the prediction mode and the data region of the residual blocks that are marked with "completed".

(12.2) The first signal processing core executes processing of the MB11 intra prediction stage taking the prediction mode and the residual blocks as an input, and outputs a decoded image. During execution of the signal processing stage, the data region is referred to entirely via the cache, without performing reading or writing of the shared memory 131 directly, explicit invalidate and write back of the cache.

(12.3) The first signal processing core "writes back" the contents of the decoded image in the cache to the shared memory 131.

(13) The first signal processing core performs dependency resolution processing of the MB11 intra prediction stage according to "dependency resolution processing" procedures shown in FIG. 14. Reading and writing of the dependency information table 133 is performed by directly referring to and updating the shared memory 131 without passing through the cache.

(13.1) The first signal processing core acquires the lock of the dependency information table 133.

(13.2) FIG. 33 illustrates the state "after dependency resolution processing of intra prediction of the MB11 dependency information table". "Completed" is marked in the field for the MB21 intra prediction stage of the MB20 intra prediction stage, the MB19 intra prediction stage, the MB12 intra prediction stage and the DBF stage that depend on a decoded image that is the output of the MB11 intra prediction stage.

(13.3) The first signal processing core determines whether or not each stage that is marked with "completed" is ready for execution. Since the MB10 DBF stage is incomplete, the MB11 DBF stage is awaiting data. Because some data has not yet been generated for the MB12 intra prediction stage, the MB19 intra prediction stage, and the MB20 intra prediction stage, respectively, the first signal processing core determines that those stages are awaiting data.

(13.4) The first signal processing core releases the lock of the dependency information table 133.

(14) Since there is no execution request that should be processed, the first signal processing core skips execution request processing. The third signal processing core that operates in parallel with the parsing core 101, the first single processing core, and the second signal processing core operates in the following manner in accordance with the procedures described in "PE task operations" shown in FIG. 3.

(15) The third signal processing core performs execution processing of the MB10 DBF stage.

(15.1) The third signal processing core checks the dependency information table 133 of the MB10 DBF stage (at this time, the lock of the dependency information table 133 is not necessary), and "invalidates" the cache contents for the data region of the BS value that is marked with "completed". "Invalidation" of the cache is not performed for the data region of the decoded image since that operation is executed immediately before by the same processor.

(15.2) The third signal processing core executes processing of the MB10 DBF stage taking the BS value and the decoded image as an input, and outputs a DBF-completed decoded image. During execution of the signal processing stage, the data region is referred to entirely via the cache without performing reading or writing of the shared memory 131 directly, explicit invalidate and write back of the cache.

(15.3) The third signal processing core "writes back" the contents of the data region of the DBF-completed decoded image in the cache to the shared memory 131.

(16) The third signal processing core performs dependency resolution processing of the MB10 DBF stage in accordance with the "dependency resolution processing" procedures shown in FIG. 14. Reading from and writing to the dependency information table 133 is performed by directly referring to and updating the shared memory 131 without passing through the cache.

(16.1) The third signal processing core acquires the lock of the dependency information table 133.

(16.2) FIG. 34 illustrates the state "after dependency resolution processing of intra prediction of the MB11 dependency information table". "Completed" is marked in the field of the dependency information table MB10 DBF stage of the MB18 DBF stage and the MB11 DBF stage that depend on a DBF-completed decoded image that is the output of the MB10 DBF stage.

(16.3) The third signal processing core determines whether or not each stage that is marked with "completed" is ready for execution. Since all the data is arranged for the MB11 DBF stage, the third signal processing core determines that this stage is ready for execution. Because some data has not yet been generated for the MB18 DBF stage, the third signal processing core determines that this stage is awaiting data.

(16.4) The third signal processing core releases the lock of the dependency information table 133.

(17) The first signal processing core performs execution request processing (addition of a stage to the queue). Reading from and writing to the ready queue 132 is performed by directly referring to and updating the shared memory 131 without passing through the cache.

(17.1) The lock of the ready queue 132 is acquired.

(17.2) The MB11 DBF stage that is judged to be ready for execution is registered in the ready queue 132.

(17.3) After registration to the ready queue 132 is completed, the other cores are notified that a new request is added. (Confirmation that a notification is received is not performed.) (*3) (See FIG. 27).

(17.4) The lock of the ready queue 132 is released.

After completion of (14), the first signal processing core that operates in parallel with the parsing core 101 and the second signal processing core is in a state in which it is waiting for a notification from the request acceptance processing.

(18) The first signal processing core receives the notification of *3 of the second signal processing core and returns from the waiting state to perform request acceptance processing (fetching of a stage from the queue). Reading from and writing to the ready queue 132 is performed by directly referring to and updating the shared memory 131 without passing through the cache.

(18.1) The first signal processing core acquires the lock of the ready queue 132.

(18.2) The first signal processing core confirms whether there is a stage ready for execution registered in the ready queue 132. In this case, the MB11 DBF stage is registered in the ready queue 132.

(18.3) The first signal processing core fetches the MB11 DBF stage from the ready queue 132.

(18.4) The first signal processing core releases the lock of the ready queue 132.

(19) The first signal processing core performs execution processing of the MB11 DBF stage.

(19.1) The first signal processing core checks the dependency information table 133 of the MB11 DBF stage (at this time, the lock of the dependency information table 133 is not necessary), and "invalidates" the cache contents for the data region of the decoded image and the data region of the BS value that are marked with "completed".

(19.2) The first signal processing core executes processing of the MB11 DBF stage by taking the BS value and the decoded image as an input, and outputs a DBF-completed decoded image. During execution of the signal processing stage, the data region is referred to entirely via the cache without performing reading or writing of the shared memory 131 directly, explicit invalidate and write back of the cache.

(19.3) The first signal processing core "writes back" the contents of the data region of the DBF-completed decoded image in the cache to the shared memory 131.

(20) The first signal processing core performs dependency resolution processing of the MB11 DBF stage according to the "dependency resolution processing" procedures shown in FIG. 14. Reading and writing of the dependency information table 133 is performed by directly referring to and updating the shared memory 131 without passing through the cache.

(20.1) The first signal processing core acquires the lock of the dependency information table 133.

(20.2) The first signal processing core marks "completed" in the dependency information table MB11 DBF stage field of the DBF stage of MB12 and the DBF stage of MB19 that depend on the DBF-completed decoded image that is the output of the MB11 DBF stage.

(20.3) The first signal processing core determines whether or not each stage that is marked with "completed" is ready for execution. Because some data has not yet been generated for both the MB12 DBF stage and the MB19 DBF stage, the first signal processing core determines that these stages are awaiting data.

(20.4) The first signal processing core releases the lock of the dependency information table 133.

According to the steps of the above described second embodiment, decoding processing of one macroblock can be completed in a case using intra prediction in which there is data dependency between macroblocks.

Third Embodiment

According to the third embodiment of the present invention, decoding processing is described for a case using motion compensation utilizing a motion vector of a parsing result.

Figure 35:
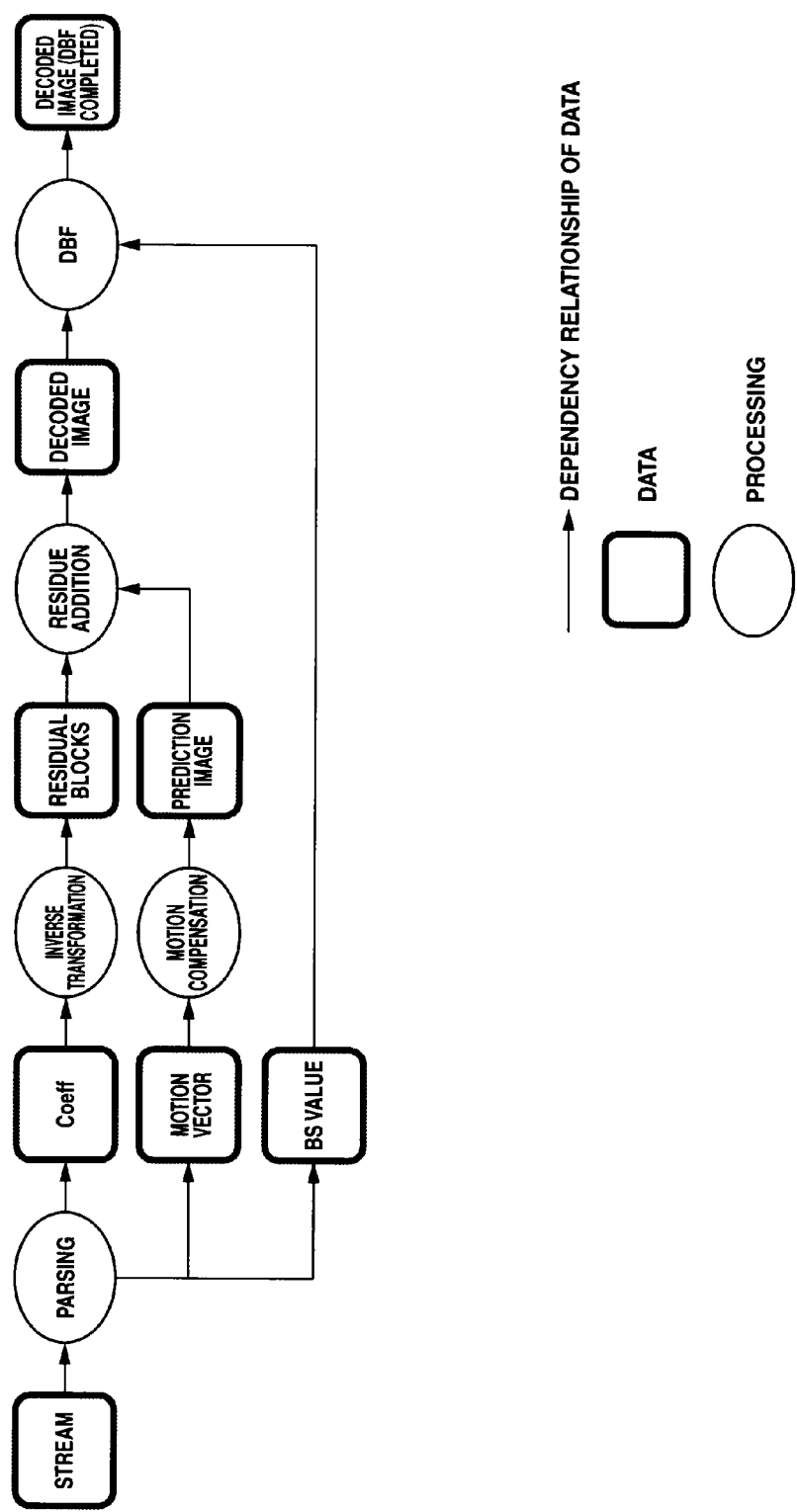
FIG. 35 is a view that illustrates P slice MB0 decoding processing in a memory management system according to a third embodiment of the present invention.

FIG. 35 is a view that illustrates "P slice MB0 decoding processing" in a memory management system according to the third embodiment of the present invention. A P slice is a slice that is encoded by inter prediction.

The decoding processing is performed by carrying out the following four steps by coordinated operation between the single parsing core and three signal processing cores.

Step 1. An image encoding stream corresponding to MB0 is input, parsing is performed, and a Coeff of MB0, a motion vector of MB0, and a BS value of MB0 are output.

Step 2. Inverse transformation is performed taking the Coeff of MB0 as an input, and residual blocks of MB0 are output.

Step 3. Motion compensation is performed by taking as an input the residual blocks of MB0 and the motion vector of MB0, and a prediction image of MB0 is output.

Step 4. Residue addition is performed by taking as an input the prediction image of MB0 and the residual blocks of MB0, and a decoded image of MB0 is output.

Step 5. DBF is performed by taking as an input the decoded image of MB0, a DBF-completed decoded image of MB10, a DBF-completed decoded image of MB2, and a BS value of MB0, and as a result a DBF-completed decoded image of MB0 is output.

FIG. 36 is a view that illustrates a sequence diagram (P slice MB0 vicinity) of the P slice MB0 decoding processing illustrated in FIG. 35. A P slice is a slice that is encoded by prediction using an image sample of one other image.

The parsing core 101 operates as described below with respect to MB0 in accordance with the procedures described in "host task operations" shown in FIG. 2.

In the following description, reference numerals (1) to (18) and *1 to *3 correspond to reference numerals (1) to (18) and *1 to *3 that are used in FIG. 36.

(1) The parsing core 101 executes the parsing stage for MB0, and outputs slice information (whether the slice is a P slice or an I slice), and the MB0 Coeff, motion vector, and BS value.

(2) The parsing core 101 performs dependency resolution processing of the parsing stage of MB0. Reading and writing of the dependency information table 133 is performed by referring to and updating the shared memory 131 directly without passing through the cache.

(2.1) The parsing core 101 acquires the lock of the dependency information table 133.

(2.2) FIG. 37 illustrates the "initial state of the MB0 dependency information table". FIG. 38 shows the state "after dependency information creation of the MB0 dependency information table". The parsing core 101 performs dependency information creation processing in accordance with the "dependency information creation processing" procedures shown in FIG. 13. Based on the results of the MB0 parsing stage, the parsing core 101 determines that MB0 is a macroblock that uses motion compensation, and sets inverse transformation to valid, motion compensation to valid, residue addition to valid, intra prediction to invalid, and DBF to valid in the stage validity field. Since MB0 is positioned at the upper left-most position in the screen, the parsing core 101 places an "invalid" mark in the BF left MB and the upper MB, respectively.

(2.3) FIG. 39 is a view that illustrates the state "after dependency resolution processing of parsing of the MB0 dependency information table". "Completed" is marked in the parsing stage column of MB0 for the inverse transformation stage of MB0 that is dependent on the output and the MB0 Coeff of the parsing stage of MB0. Similarly, with respect to the MB0 BS value and the MB0 motion vector, "completed" is marked in the relevant columns for the respectively corresponding MB0 DBF stage and MB0 motion compensation stage.

(2.4) The parsing core 101 determines whether or not each stage for which "completed" is marked is ready for execution. Since all the data is arranged for the MB0 inverse transformation stage, the parsing core 101 determines that this stage is ready for execution. Since MB0 residue addition is marked "incomplete" for the MB0 DBF stage, the parsing core 101 determines that this stage is awaiting data.

(2.5) The parsing core 101 releases the lock of the dependency information table 133.

(3) The parsing core 101 performs execution request processing (addition of stage to queue). Reading from and writing to the ready queue 132 is performed by directly referring to and updating the shared memory 131 without passing through the cache.

(3.1) The parsing core 101 acquires the lock of the ready queue 132.

(3.2) The parsing core 101 registers the MB0 inverse transformation stage that is judged as ready for execution in the ready queue 132.

(3.3) After registration to the ready queue 132 is completed, the parsing core 101 notifies the other cores that a new request is added. (Confirmation that a notification is received is not carried out.) (*1) (See FIG. 36).

(3.4) The parsing core 101 releases the lock of the ready queue 132.

When the parsing core 101 completes execution of the processing to this point, the parsing core 101 starts executing the parsing stage of MB1 in accordance with the procedures described in "host task operations" shown in FIG. 2.

The first signal processing core that is operating in parallel with the parsing core 101 operates in the following manner in accordance with the procedures described in "PE task operations" shown in FIG. 3.

(4) The first signal processing core performs request acceptance processing (fetching of a stage from the queue). Reading from and writing to the ready queue 132 is performed by directly referring to and updating the shared memory 131 without passing through the cache.

(4.1) The first signal processing core acquires the lock of the ready queue 132.

(4.2) The first signal processing core confirms whether there is a stage ready for execution registered in the ready queue 132. In this case, no stage has been registered yet.

(4.3) The first signal processing core releases the lock of the ready queue 132.

(4.4) The first signal processing core waits until a notification is received from another core to the effect that a stage has been newly registered in the ready queue 132.

(4.5) Upon receiving a notification of a new stage registration from the parsing core 101 (*1), the first signal processing core returns from the waiting state.

(4.6) The first signal processing core acquires the lock of the ready queue 132.

(4.7) The first signal processing core confirms whether there is a stage ready for execution registered in the ready queue 132. In this case, the MB0 inverse transformation stage is registered in the ready queue 132.

(4.8) The first signal processing core fetches the MB0 inverse transformation stage from the ready queue 132.

(4.9) The first signal processing core releases the lock of the ready queue 132.

(5) The first signal processing core performs execution processing of the MB0 inverse transformation stage.

(5.1) The first signal processing core checks the dependency information table 133 of the MB0 inverse transformation stage (at this time, the lock of the dependency information table 133 is not necessary), and "invalidates" the cache contents for the Coeff data region that is marked with "completed".

(5.2) The first signal processing core executes processing of the MB0 inverse transformation stage by taking Coeff as an input, and outputs residual blocks. During execution of the signal processing stage, the data region is referred to entirely via the cache, without performing reading or writing of the shared memory 131 directly, explicit invalidate and write back of the cache.

(5.3) The first signal processing core "writes back" the contents of the residual blocks in the cache to the shared memory 131.

(6) The first signal processing core performs dependency resolution processing of the inverse transformation stage of MB0 in accordance with the "dependency resolution processing" procedures shown in FIG. 14. Reading and writing of the dependency information table 133 is performed by referring to and updating the shared memory 131 directly without passing through the cache.

(6.1) The first signal processing core acquires the lock of the dependency information table 133.

(6.2) FIG. 40 illustrates the state "after dependency resolution processing of MB0 inverse transformation of the MB0 dependency information table". "Completed" is marked in the field for the MB0 inverse transformation stage of the of the residue addition stage that depends on residual blocks that are the output of the inverse transformation stage of MB0.

(6.3) The first signal processing core determines whether or not each stage that is marked with "completed" is ready for execution. Since the MB0 motion compensation stage is "incomplete", the first signal processing core determines that the MB0 residue addition stage is awaiting data.

(6.4) The first signal processing core releases the lock of the dependency information table 133.

(7) The first signal processing core performs execution request processing (addition of a stage to the queue). Since there is no new stage that is ready for execution, the first signal processing core skips the execution request processing.

The second signal processing core that operates in parallel with the parsing core 101 and the first signal processing core operates in the following manner in accordance with the procedures described in "PE task operations" shown in FIG. 3.

(8) The second signal processing core performs request acceptance processing (fetches a stage from the queue). Reading from and writing to the ready queue 132 is performed by directly referring to and updating the shared memory 131 without passing through the cache.

(8.1) The second signal processing core acquires the lock of the ready queue 132.

(8.2) The second signal processing core confirms whether there is a stage ready for execution registered in the ready queue 132. In this case, no stage has been registered yet.

(8.3) The second signal processing core releases the lock of the ready queue 132.

(8.4) The second signal processing core waits until a notification is received from another core to the effect that a stage has been newly registered in the ready queue 132.

(8.5) Upon receiving a notification of a new stage registration from the parsing core 101 (*1), the second signal processing core returns from the waiting state.

(8.6) The second signal processing core acquires the lock of the ready queue 132.

(8.7) The second signal processing core confirms whether there is a stage ready for execution registered in the ready queue 132. In this case, there is no stage for which the MB0 motion compensation stage is registered in the ready queue 132.

(8.8) The second signal processing core releases the lock of the ready queue 132.

(9) The second signal processing core performs execution processing of the MB0 motion compensation stage.

(9.1) The second signal processing core checks the dependency information table 133 of the MB0 motion compensation stage (at this time, the lock of the dependency information table 133 is not necessary), and "invalidates" the cache contents for the data region of the residual blocks and the data region of the prediction mode that are marked with "completed".

(9.2) The second signal processing core executes processing of the MB0 motion compensation stage by taking the motion vector as an input, and outputs a prediction image. During execution of the signal processing stage, the data region is referred to entirely via the cache without performing reading or writing of the shared memory 131 directly, explicit invalidate and write back of the cache.

(9.3) The second signal processing core "writes back" the contents of the decoded image in the cache to the shared memory 131.

(10) The second signal processing core performs dependency resolution processing of the MB0 motion compensation stage according to the "dependency resolution processing" procedures shown in FIG. 14. Reading and writing of the dependency information table 133 is performed by directly referring to and updating the shared memory 131 without passing through the cache.

(10.1) The second signal processing core acquires the lock of the dependency information table 133.

(10.2) FIG. 41 illustrates the state "after dependency resolution processing of motion compensation of the MB0 dependency information table". "Completed" is marked in the field of the MB0 motion compensation stage of the residue addition stage of MB0 that depends on a decoded image that is the output of the MB0 motion compensation stage.

(10.3) The second signal processing core determines whether or not each stage that is marked with "completed" is ready for execution. Since all the data is arranged for the MB0 residue addition stage, the second signal processing core determines that this stage is ready for execution.

(10.4) The second signal processing core releases the lock of the dependency information table 133.

(11) The second signal processing core performs execution request processing (addition of a stage to the queue). Reading from and writing to the ready queue 132 is performed by directly referring to and updating the shared memory 131 without passing through the cache.

(11.1) The second signal processing core acquires the lock of the ready queue 132.

(11.2) The second signal processing core registers the MB0 residue addition stage that is judged to be ready for execution in the ready queue 132.

(11.3) After registering to the ready queue 132 is completed, the second signal processing core notifies the other cores that a new request is added. (Confirmation that a notification is received is not performed.) (*2) (See FIG. 36).

(11.4) The second signal processing core releases the lock of the ready queue 132.

The third signal processing core that is operating in parallel with the parsing core 101 and the second signal processing core is in a state in which it is waiting for a notification from the request acceptance processing.

(12) Upon receiving the notification at *2 of the second signal processing core, the third signal processing core returns from the waiting state and performs request acceptance processing (fetches a stage from the queue). Reading from and writing to the ready queue 132 is performed by directly referring to and updating the shared memory 131 without passing through the cache.

(12.1) The third signal processing core acquires the lock of the ready queue 132.

(12.2) The third signal processing core confirms whether there is a stage ready for execution registered in the ready queue 132. In this case, the MB0 residue addition stage is registered in the ready queue 132.

(12.3) The third signal processing core fetches the residue addition stage from the ready queue 132.

(12.4) The third signal processing core releases the lock of the ready queue 132.

(13) The third signal processing core performs execution processing of the MB0 residue addition stage.

(13.1) The third signal processing core checks the dependency information table 133 of the MB0 residue addition stage (at this time, the lock of the dependency information table 133 is not required) and "invalidates" the cache contents for a data region of the MB0 residual blocks and the MB0 prediction image that are marked with "completed"

(13.2) The third signal processing core executes processing of the MB0 residue addition stage by taking the MB0 residual blocks and the MB0 prediction image as an input, and outputs a decoded image. During execution of the signal processing stage, the data region is referred to entirely via the cache, without performing reading or writing of the shared memory 131 directly, explicit invalidate and write back of the cache.

(13.3) The third signal processing core "writes back" the contents of the data region of the decoded image in the cache to the shared memory 131.

(14) The third signal processing core performs dependency resolution processing of the MB0 residue addition stage in accordance with the "dependency resolution processing" procedures described in FIG. 14. Reading and writing of the dependency information table 133 is performed by directly referring to and updating the shared memory 131 without passing through the cache.

(14.1) The third signal processing core acquires the lock of the dependency information table 133.

(14.2) FIG. 42 illustrates the state "after MB0 residue addition dependency resolution processing of the MB0 dependency information table". "Completed" is marked in the field for the MB0 residue addition stage of the MB12 intra prediction stage, the MB11 intra prediction stage, the MB1 intra prediction stage, and the MB0 DBF stage that depend on a decoded image that is the output of the MB0 residue addition stage.

(14.3) The third signal processing core determines whether or not each stage that is marked with "completed" is ready for execution. Since all the fields of the MB0 DBF stage are marked with "completed", the third signal processing core determines that this stage is ready for execution. Because there is "incomplete" data for the intra prediction stage of MB1, the intra prediction stage of MB11, and the intra prediction stage of MB12, the third signal processing core determines that those stages are awaiting data.

(14.4) The third signal processing core releases the lock of the dependency information table 133.

(15) The third signal processing core performs execution request processing (addition of a stage to the queue). Reading from and writing to the ready queue 132 is performed by directly referring to and updating the shared memory 131 without passing through the cache.

(15.1) The third signal processing core acquires the lock of the ready queue 132.

(15.2) The third signal processing core registers the MB0 DBF stage that is determined as being ready for execution in the ready queue 132.

(15.3) After registration to the ready queue 132 is completed, the third signal processing core notifies the other cores that a new request is added. (Confirmation that a notification is received is not performed.) (*2) (See FIG. 36).

(15.4) The third signal processing core releases the lock of the ready queue 132.

The first signal processing core that operates in parallel with the parsing core 101, the second signal processing core, and the third signal processing core is in a state in which it is awaiting notification from the request acceptance processing.

(16) Upon receiving the notification at *2 of the third signal processing core, the first signal processing core returns from the waiting state and performs request acceptance processing (fetches a stage from the queue). Reading from and writing to the ready queue 132 is performed by directly referring to and updating the shared memory 131 without passing through the cache.

(16.1) The first signal processing core acquires the lock of the ready queue 132.

(16.2) The first signal processing core confirms whether there is a stage ready for execution registered in the ready queue 132. In this case, the MB0 DBF stage is registered in the ready queue 132.

(16.3) The first signal processing core fetches the MB0 DBF stage from the ready queue 132.

(16.4) The first signal processing core releases the lock of the ready queue 132.

(17) The first signal processing core performs execution processing of the MB0 DBF stage.

(17.1) The first signal processing core checks the dependency information table 133 of the MB0 DBF stage (at this time, the lock of the dependency information table 133 is not required) and "invalidates" the cache contents for the data region of the decoded image and the data region of the BS value that are marked with "completed"

(17.2) The first signal processing core executes processing of the MB0 DBF stage by taking the BS value and the decoded image as an input, and outputs a DBF-completed decoded image. During execution of the signal processing stage, the data region is referred to entirely via the cache, without performing reading or writing of the shared memory 131 directly, explicit invalidate and write back of the cache.

(17.3) The first signal processing core "writes back" the contents of the data region of the DBF-completed decoded image in the cache to the shared memory 131.

(18) The first signal processing core performs dependency resolution processing of the MB0 DBF stage in accordance with the "dependency resolution processing" procedures described in FIG. 14. Reading and writing of the dependency information table 133 is performed by directly referring to and updating the shared memory 131 without passing through the cache.

(18.1) The first signal processing core acquires the lock of the dependency information table 133.

(18.2) The first signal processing core marks "completed" in the dependency information table MB0 DBF stage field of the DBF stage of MB11 (bottom side MB) and the DBF stage of MB1 (right side MB) that depend on the DBF-completed decoded image that is the output of the MB0 DBF stage.

(18.3) The first signal processing core determines whether or not each stage that is marked with "completed" is ready for execution. Since data has is yet to be generated for both the MB1 DBF stage and the MB11 DBF stage, the first signal processing core determines that these stages are awaiting data.

(18.4) The first signal processing core releases the lock of the dependency information table 133.

According to the above steps of the third embodiment, processing of the amount of one macroblock of decoding processing in a case using motion compensation can be completed.

According to the present embodiments as described in the foregoing, in a multiprocessor system having a plurality of processors, a cache memory and a shared memory, a memory management system that can efficiently manage coherency between a cache memory and a shared memory when performing image processing can be realized without increasing the hardware scale.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A memory management system, comprising:
    a plurality of processors;
    a shared memory that can be accessed from the plurality of processors; and
    a cache memory that is provided between the shared memory and each processor of the plurality of processors, and wherein invalidation and write back of a specified region in the shared memory can be commanded from programs running on each of the processors based on data stored in the cache memory;
    wherein at least one of the programs:
        invalidates, as a first processing batch, an input data region storing input data in the cache memory using an invalidation command of a specified region immediately before execution of the at least one program; and
        writes back, as a second processing batch, an output data region that stores output data in the cache memory to the shared memory using a write back command for a specified region immediately after execution of operations of the at least one program except for the writing back;

wherein the programs operating on each processor of the plurality of processors each individually determines an input data region and an output data region of a third processing batch in the cache memory on the basis of an input/output relationship of a dependency information table that controls an execution sequence of the programs.

2. An image processing apparatus including a memory management system according to claim 1.

3. A memory management system, comprising:

a plurality of processors;

a shared memory that can be accessed from the plurality of processors; and a cache memory that is provided between the shared memory and each processor of the plurality of processors, and wherein invalidation and write back of a specified region in the shared memory can be commanded from programs running on each of the processors based on data stored in the cache memory;

wherein at least one of the programs:

invalidates, as a first processing batch, an input data region storing input data in the cache memory using an invalidation command of a specified region immediately before execution of the at least one program; and writes back, as a second processing batch, an output data region that stores output data in the cache memory to the shared memory using a write back command for a specified region immediately after execution of operations of the at least one program except for the writing back;

wherein the programs operating on each processor of the plurality of processors each individually determines an input data region and an output data region of a third processing batch in the cache memory on the basis of an input/output relationship between output data as a calculation result and input data used by one of the programs as a fourth processing batch based on contents of header information of a dynamic image encoding stream.

4. An image processing apparatus including a memory management system according to claim 3.

5. A memory management system, comprising:

a plurality of processors;

a shared memory that can be accessed from the plurality of processors; and a cache memory that is provided between the shared memory and each processor of the plurality of processors, and wherein invalidation and write back of a specified region in the shared memory can be commanded from programs running on each of the processors based on data stored in the cache memory;

wherein at least one of the programs:

invalidates, as a first processing batch, an input data region storing input data in the cache memory using an invalidation command of a specified region immediately before execution of the at least one program; and writes back, as a second processing batch, an output data region that stores output data in the cache memory to the shared memory using a write back command for a specified region immediately after execution of operations of the at least one program except for the writing back;

wherein the programs operating on each processor of the plurality of processors each individually omits execution of an operation to invalidate an input data region that stores input data in the cache memory in a case in which, with regard to certain of the programs as two processing batches that are processed in succession, a processing result of one of the certain of the programs as a preceding processing batch is utilized by another one of the certain of the programs as a succeeding processing batch on the same processor.

6. An image processing apparatus including a memory management system according to claim 5.

7. A memory management system, comprising:

a plurality of processors;

a shared memory that can be accessed from the plurality of processors; and a cache memory that is provided between the shared memory and each processor of the plurality of processors, and wherein invalidation and write back of a specified region in the shared memory can be commanded from programs running on each of the processors based on data stored in the cache memory; wherein:

the shared memory includes a dependency information table that controls an execution sequence of the programs, and a queue that stores processing batches as parts of the programs that are judged to be ready for execution based on dependency resolution processing according to the dependency information table;

the programs are operated with respect to the processing batches that run on the plurality of processors, so that the processing batches that are not in a dependency relationship with each other are run at a same time and the processing batches that are in a dependency relationship with each other are not run at the same time by using the dependency information table and the queue; and when the respective processors write data to the cache memory, the at least one of the programs issues commands for invalidation and for write back respectively, at respective timings immediately before execution and immediately after execution of at least one of the processing batches, so as to enable coherency between contents of the cache memory and contents of the shared memory.

8. An image processing apparatus including a memory management system according to claim 7.

9. An image processing apparatus, comprising:

a parsing processor that performs parsing based on an image encoding stream that is input and that extracts parameters required to perform decoding;

at least one signal processing processor for performing image signal processing based on parameters that are extracted to generate a decoded image;

a first cache memory accessible only by the parsing processor, and a second cache memory accessible only by the at least one signal processor, the parsing processor configured to issue commands to invalidate and write back a specified region of the first cache memory, and the at least one signal processor configured to issue commands to invalidate and write back a specified region of the second cache memory; and a shared memory accessible by the parsing processor and the at least one signal processing processor, the shared memory storing programs that are run by the parsing processor and the at least one signal processor;

wherein at least one of the programs:

invalidates, as a first processing batch, an input data region storing input data in the cache memory using an invalidation command of a specified region immediately before execution of the at least one program; and writes back, as a second processing batch, an output data region that stores output data in the cache memory to the shared memory using a write back command for a specified region immediately after execution of operations of the at least one program except for the writing back;

wherein:

the shared memory is a memory in which are written a parsing processing program; signal processing programs including an inverse transformation program, a motion compensation program, a residue addition program, an intra prediction program, and a deblocking filter program; a dependency information table that controls an execution sequence of the programs that includes a resolution status of a dependency relationship between the parsing processing program and the signal processing program with respect to a certain image processing; and a command regarding which image processing should be performed; and which includes: a queue that stores a program of a processing batch that is determined to be ready for execution based on dependency resolution processing according to the dependency information table; a host task that is activated by the parsing processor and which makes an execution request for one of the programs of a first processing batch with respect to the queue; and a processing elements task that receives an execution request for a program of the host task and executes image processing and also makes an execution request for another of the first programs of a second processing batch with respect to the queue.

10. The image processing apparatus according to claim 9, wherein the programs operating on each processor of the plurality of processors each determines an input data region and an output data region of a third processing batch in the cache memory on the basis of an input/output relationship of a dependency information table that controls an execution sequence of the programs.

11. The image processing apparatus according to claim 9, wherein the programs operating on each processor of the plurality of processors each determines an input data region and an output data region of a third processing batch in the cache memory on the basis of an input/output relationship between output data as a calculation result and input data used by another of the programs as a fourth processing batch based on contents of header information of a dynamic image encoding stream.

12. The image processing apparatus according to claim 9, wherein the programs operating on each processor of the plurality of processors each omits execution of an operation to invalidate an input data region that stores input data in the cache memory in a case in which, with regard to the programs as third and fourth processing batches that are processed in succession, a processing result of one of the programs as a preceding processing batch is utilized by another of the programs as a succeeding processing batch on the same processor.

13. An image processing apparatus, comprising:

a parsing processor that performs parsing based on an image encoding stream that is input and that extracts parameters required to perform decoding;

at least one signal processing processor for performing image signal processing based on parameters that are extracted to generate a decoded image;

a first cache memory accessible only by the parsing processor, and a second cache memory accessible only by the at least one signal processor, the parsing processor configured to issue commands to invalidate and write back a specified region of the first cache memory, and the at least one signal processor configured to issue commands to invalidate and write back a specified region of the second cache memory; and a shared memory accessible by the parsing processor and the at least one signal processing processor, the shared memory storing programs that are run by the parsing processor and the at least one signal processor;

wherein at least one of the programs:

invalidates, as a first processing batch, an input data region storing input data in the cache memory using an invalidation command of a specified region immediately before execution of the at least one program; and writes back, as a second processing batch, an output data region that stores output data in the cache memory to the shared memory using a write back command for a specified region immediately after execution of operations of the at least one program except for the writing back;

wherein the programs operating on each processor of the plurality of processors each individually determines an input data region and an output data region of a third processing batch in the cache memory on the basis of an input/output relationship of a dependency information table that controls an execution sequence of the programs.

14. An image processing apparatus, comprising:

a parsing processor that performs parsing based on an image encoding stream that is input and that extracts parameters required to perform decoding;

at least one signal processing processor for performing image signal processing based on parameters that are extracted to generate a decoded image;

a first cache memory accessible only by the parsing processor, and a second cache memory accessible only by the at least one signal processor, the parsing processor configured to issue commands to invalidate and write back a specified region of the first cache memory, and the at least one signal processor configured to issue commands to invalidate and write back a specified region of the second cache memory; and a shared memory accessible by the parsing processor and the at least one signal processing processor, the shared memory storing programs that are run by the parsing processor and the at least one signal processor;

wherein at least one of the programs:

invalidates, as a first processing batch, an input data region storing input data in the cache memory using an invalidation command of a specified region immediately before execution of the at least one program; and writes back, as a second processing batch, an output data region that stores output data in the cache memory to the shared memory using a write back command for a specified region immediately after execution of operations of the at least one program except for the writing back;

wherein the programs operating on each processor of the plurality of processors each individually determines an input data region and an output data region of a third processing batch in the cache memory on the basis of an input/output relationship between output data as a calculation result and input data used by one of the programs as a fourth processing batch based on contents of header information of a dynamic image encoding stream.

15. An image processing apparatus, comprising:

a parsing processor that performs parsing based on an image encoding stream that is input and that extracts parameters required to perform decoding;

at least one signal processing processor for performing image signal processing based on parameters that are extracted to generate a decoded image;

a first cache memory accessible only by the parsing processor, and a second cache memory accessible only by the at least one signal processor, the parsing processor configured to issue commands to invalidate and write back a specified region of the first cache memory, and the at least one signal processor configured to issue commands to invalidate and write back a specified region of the second cache memory; and a shared memory accessible by the parsing processor and the at least one signal processing processor, the shared memory storing programs that are run by the parsing processor and the at least one signal processor;

wherein at least one of the programs:

invalidates, as a first processing batch, an input data region storing input data in the cache memory using an invalidation command of a specified region immediately before execution of the at least one program; and writes back, as a second processing batch, an output data region that stores output data in the cache memory to the shared memory using a write back command for a specified region immediately after execution of operations of the at least one program except for the writing back, wherein the programs operating on each processor of the plurality of processors each individually omits execution of an operation to invalidate an input data region that stores input data in the cache memory in a case in which, with regard to certain of the programs as third and fourth processing batches that are processed in succession, a processing result of one of the certain of the programs as a preceding processing batch is utilized by another of the certain of the programs as a succeeding processing batch on the same processor.

* * * * *